(12) United States Patent
Anand et al.

(10) Patent No.: US 6,377,581 B1
(45) Date of Patent: *Apr. 23, 2002

(54) OPTIMIZED CPU-MEMORY HIGH BANDWIDTH MULTIBUS STRUCTURE SIMULTANEOUSLY SUPPORTING DESIGN REUSABLE BLOCKS

(75) Inventors: Vishal Anand, Fremont, CA (US); Desi Rhoden, Phoenix, AZ (US)

(73) Assignee: VLSI Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/079,990

(22) Filed: May 14, 1998

(51) Int. Cl.[7] .............................................. H04L 12/66
(52) U.S. Cl. ...................................... 370/402; 710/129
(58) Field of Search ................................ 370/360, 362, 370/363, 364, 365, 366, 375, 447, 461, 462, 422, 423, 402; 210/100, 105, 110, 113, 126, 129, 130, 241

(56) References Cited

U.S. PATENT DOCUMENTS

| | | | | |
|---|---|---|---|---|
| 5,440,752 A | * | 8/1995 | Lentz et al. ................... 710/12 |
| 5,548,780 A | * | 8/1996 | Krein ............................ 710/5 |
| 5,761,454 A | * | 6/1998 | Adusumilli et al. ........ 710/126 |
| 5,768,543 A | * | 6/1998 | Hiles ........................... 710/107 |
| 5,805,873 A | * | 9/1998 | Roy ............................. 713/502 |
| 6,047,001 A | * | 4/2000 | Kuo et al. .................... 370/428 |
| 6,052,754 A | * | 4/2000 | Anand .......................... 710/129 |
| 6,076,128 A | * | 6/2000 | Kamijo et al. ............... 710/128 |

* cited by examiner

Primary Examiner—Kwang Bin Yao
(74) Attorney, Agent, or Firm—Wagner, Murabito & Hao LLP

(57) ABSTRACT

An optimized CPU-memory high bandwidth multibus structure simultaneously supporting design reusable blocks. A system in accordance with the present invention communicatively couples the internal components (e.g., CPU, memory, etc.) and peripheral devices (e.g., display, keyboard, etc.) of a computer system by dividing the components into two logical subdivisions. One subdivision includes the memory and CPU(s) of the computer system while the other subdivision includes the remaining components. In accordance with the present invention, each subdivision of components is interconnected to the other components of its subdivision by a bus scheme. Both subdivision bus schemes are interconnected by circuitry referred to as a bridge, which enables them to intercommunicate. As such, the components connected to the separate subdivision bus schemes are able to intercommunicate. By implementing the intercommunication of computer system components in this manner, a substantial part of the interconnection circuitry of the computer system is typically reusable when significant modifications are subsequently implemented within future related computer systems. Furthermore, this system in accordance with the present invention does not become overly complex and/or excessively large when significant modifications are later implemented.

19 Claims, 42 Drawing Sheets

| bit 0 | bit 1 | bit 2 | SPACE |
|---|---|---|---|
| 1 | 0 | 0 | MEMORY |
| 0 | 1 | 0 | IO |
| 0 | 0 | 1 | CONFIG |
| 0 | 0 | 0 | SPECIAL |

FIGURE 7

| WRITE | TT1 | TT0 | TRANSACTION |
|---|---|---|---|
| X | X | 0 | NON COHERENT CYCLE |
| X | 0 | 1 | COHERENT CYCLE |
| 0 | 1 | 1 | COHERENT READ WITH INTENT TO MODIFY |
| 1 | 1 | 1 | COHERENT WRITE TO INVALIDATE |

FIGURE 8

| Beats [2:0] | No. of Beats |
|---|---|
| 000 | 1 |
| 001 | 2 |
| 010 | 3 |
| 011 | 4 |
| 100 | 5 |
| 101 | 6 |
| 110 | 7 |
| 111 | 8 |

FIGURE 9

| tsiz [3:0] | No. of Bytes |
|---|---|
| 0000 | 1 |
| 0001 | 2 |
| 0010 | 3 |
| 0011 | 4 |
| 0100 | 5 |
| 0101 | 6 |
| 0110 | 7 |
| 0111 | 8 |

FIGURE 10

| DATA TRANSFER | a[ 4:3 ] = 00 | a[ 4:3 ] = 01 | a[ 4:3 ] = 10 | a[ 4:3 ] = 11 |
|---|---|---|---|---|
| 1st data beat | DW0 | DW1 | DW2 | DW3 |
| 2nd data beat | DW1 | DW2 | DW3 | DW0 |
| 3rd data beat | DW2 | DW3 | DW0 | DW1 |
| 4th data beat | DW3 | DW0 | DW1 | DW2 |

FIGURE 13

| Stage$_n$ (qreq_, qack_) | Stage$_{n-1}$ | DESCRIPTION |
|---|---|---|
| 1 (H, H) | - | NORMAL OPERATION MODE. |
| 2 (L, H) | 1 | MODULE IS REQUESTED TO CEASE ALL ACTIVITY. |
| 3 (L, L) | - | MODULE HAS CEASED ALL ACTIVITY AND ITS CLOCK CAN BE TURNED OFF. |
| 4, (L, H) | 3 | MODULE IS REQUESTING TO COME OUT OF LOW POWER STAGE DUE TO SOME EXTERNAL ACTIVITY. |
| 5, (H, L) | 3 | MODULE IS REQUESTED TO COME BACK ALIVE. |

FIGURE 14

OPTIMIZED CPU-MEMORY HIGH BANDWIDTH MULTIBUS STRUCTURE SIMULTANEOUSLY SUPPORTING DESIGN REUSABLE BLOCKS

TECHNICAL FIELD

The present invention relates to the field of computer systems. More specifically, the present invention relates to the field of interconnecting the internal components and peripheral devices of a computer system.

BACKGROUND ART

A computer system can be fabricated from a wide variety of individual components and devices which enable it to operate and perform many desirable functions. Some of the internal components of a computer system can include a central processing unit (CPU), a computer readable volatile memory unit (e.g., random access memory, static RAM, dynamic RAM, etc.), a computer readable non-volatile memory unit (e.g., read only memory, programmable ROM, flash memory, EPROM, EEPROM, etc.), a computer readable mass data storage device such as a magnetic or optical disk, modem device, graphics hardware, sound hardware, and the like. Furthermore, some of the peripheral devices of a computer system, which increase its overall functionality, can include a display device, a keyboard for inputting alphanumeric characters, a cursor control device (e.g., mouse), a printer, a scanner, speakers, and the like. Of all the many and diverse components and devices that constitute a computer system, the CPU is its most important functional component. The CPU is made up of circuitry which receives and interprets instructions and then controls their execution within itself or within the other internal components and peripheral devices of the computer system. As such, the CPU is the "brain" of the entire computer system.

Since the CPU is so critical to the operation of the other internal components and peripheral devices of the computer system, it is necessary to couple the CPU to these various components. Within the prior art, there are differing techniques for coupling the CPU to the various components that constitute the computer system. One of these prior art techniques utilizes an integrated circuit (IC) chip, commonly referred to as a North Bridge chip, as an interface between the CPU and the remaining components. Typically, a North Bridge chip is designed and fabricated to enable the various buses of the computer system to intercommunicate, thereby enabling the CPU to communicate with the various internal components and peripheral devices coupled to the buses of the computer system. Furthermore, a North Bridge chip also enables intercommunication between the various components and devices of the computer system.

FIG. 1 is a block diagram of an example of a prior art North Bridge chip 100 used to interconnect buses 114–120 within a computer system, thereby enabling intercommunication between the internal components and peripheral devices of the computer system. In order to implement intercommunication between the computer system components, North Bridge chip 100 is substantially comprised of interface circuitry modules 102–110, which enable intercommunication between buses 114–120 of the computer system. In other words, CPU slave interface 102, CPU master interface 104, AGP interface 106, PCI interface 110, and memory interface 108 enable intercommunication between memory bus 114, peripheral component interconnect (PCI) bus 116, accelerated graphics port (AGP) bus 118, and CPU bus 120. It should be appreciated that interface modules 102–110 of North Bridge chip 100 are interconnected to each other by point-to-point buses, which are represented in FIG. 1 by the arrows that interconnect them. Typically, any two modules of North Bridge chip 100 that can potentially communicate are connected by point-to-point buses.

There are some disadvantages associated with the prior art technique of utilizing a North Bridge chip to couple a CPU to the remaining components that comprise a computer system. One of the disadvantages is that each North Bridge chip is designed and fabricated specifically to operate within a particular computer system. As such, North Bridge chips ordinarily cannot be utilized within other computer systems for which they are not designed. In other words, North Bridge chips are not generally interchangeable. Therefore, each time significant modifications are implemented within an existing or future computer system, a substantial amount of circuitry within an existing North Bridge chip typically has to be redesigned from scratch in order to accommodate the significant modifications. These significant computer system modifications can, for example, include using a different CPU family (e.g., Intel, Motorola, etc.), using a CPU having a different operating frequency, using different memory technology, using a CPU to memory bus having a different width, or adding a new module (e.g., interface or functional) to the existing design of a North Bridge chip. It should be appreciated that the of redesigning North Bridge chips would be less problematic if they were small in size. But ordinarily, North Bridge chips are significant in size. Consequently, redesigning and fabricating a North Bridge chip essentially from scratch consumes significant amounts of design time, thereby detrimentally increasing manufacturing costs.

One of the prior art practices used to reduce the amount of time required to design or redesign a North Bridge chip is to make each point-to-point bus that interconnects the individual modules all identical technology, thereby reducing the amount of unique bus technologies within the North Bridge chip and simplifying the overall design. But there are some disadvantages associated with this prior art practice. Typically, the point-to-point bus technology duplicated throughout a North Bridge chip is the CPU to memory point-to-point bus technology, which is usually the leading bus technology having the maximum data bandwidth requirement. However, some of the modules (e.g., PCI interface module) located within the North Bridge chip normally are unable to take advantage of these maximum bandwidth point-to-point buses because their particular bandwidth requirement is fixed. As such, these maximum bandwidth buses needlessly consume more silicon area within the North Bridge chip as required by the circuitry and in some circumstances also consume additional power. These are some of the disadvantages associated with the prior art practice of duplicating the maximum bandwidth point-to-point bus technology throughout a North Bridge chip.

Another disadvantage associated with the prior art technique of utilizing a North Bridge chip to interconnect a computer system is that there are physical limitations to the amount of point-to-point buses which can be implemented within the North Bridge chip. It should be appreciated that this disadvantage does not become problematic when the number of modules within a North Bridge chip are few. However, over time computer manufacturers continue to add more and more functionality to their computer systems. As such, the North Bridge chips within these computer systems are implemented with more and more functionality, causing them to become increasingly complex. Consequently, the number of interface and/or functional modules of the North Bridge chip continues to increase, thereby increasing the number of point-to-point buses which interconnect the modules. Eventually, a point is reached physically where it becomes almost impossible to route any more buses within the North Bridge chips because there are too many wires within it.

Therefore, it would be advantageous to provide a system to interconnect the internal components and peripheral devices of a computer system which is substantially reusable when significant modifications are subsequently implemented within future computer systems. Furthermore, it would also be advantageous for this same system not to become overly complex and/or excessively large when significant modifications are later implemented within future computer systems. The present invention provides these advantages.

DISCLOSURE OF THE INVENTION

The present invention includes a system which communicatively couples the internal components (e.g., CPU, memory, etc.) and peripheral devices (e.g., display device, keyboard, etc.) of a computer system by dividing the components into two logical subdivisions. One subdivision includes the memory and CPU(s) of the computer system while the other subdivision includes the remaining components or "circuit blocks" including peripheral devices. In accordance with the present invention, each subdivision of components is interconnected to the other components of its subdivision by a bus scheme. Both subdivision bus schemes are interconnected by circuitry referred to as a bridge circuit, which enables them to intercommunicate. As such, the components connected to the separate subdivision bus schemes are able to intercommunicate. By interconnecting computer system components in this manner, a substantial part of the interconnection circuitry and the circuit blocks of the computer system are typically reusable when significant modifications are subsequently implemented within future related computer systems. Furthermore, this system in accordance with the present invention does not become overly complex and/or excessively large when significant modifications are later implemented. These significant computer system modifications can, for example, include using a different CPU family (e.g., Intel, Motorola, etc.), using a CPU having a different operating frequency, using different memory technology, using a CPU to memory bus having a different width, or adding new functionality (e.g., fiber optics bus) to the computer system.

One embodiment of the present invention is an apparatus for providing communication which comprises a secondary bus having a standard communication protocol. Furthermore, the apparatus includes a plurality of circuit blocks that each contain a bus interface unit coupled to the secondary bus through external bus control circuits. Each circuit block is also coupled to a respective functional unit and is for facilitating communication between the respective functional unit and the secondary bus. Moreover, each bus interface unit internally comprises a duplicated master port unit for initiating a communication of information over the secondary bus using the standard communication protocol and a duplicated slave port unit for sending and receiving information in response to the master port over the secondary bus using the same protocol. The bridge circuit also provides point-to-point communication for the control handshake signals between a respective master port and a slave port. The apparatus further comprises a primary bus for providing point-to-point communication between a memory and a processor. A bridge is coupled to provide communication between the primary bus and the secondary bus. The primary bus and the bridge are configurable to support different communication protocols.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 7 is a table of the types of address space of the secondary bus within the present embodiment.

FIG. 8 is a table of the supported signal description of the 'transfer type' signal.

FIG. 9 is a table of an exemplary encoding for the number of beats for the 'beats' signal.

FIG. 10 is a table of an exemplary encoding for the number of bytes for the transfer size signal (tsiz).

FIG. 13 is a table that is specific for an example of a burst transfer order for 32 byte cache line size.

FIG. 14 is a table showing the stages of power management on the secondary bus within the present embodiment.

BEST MODE FOR CARRYING OUT THE INVENTION

Figure 1:
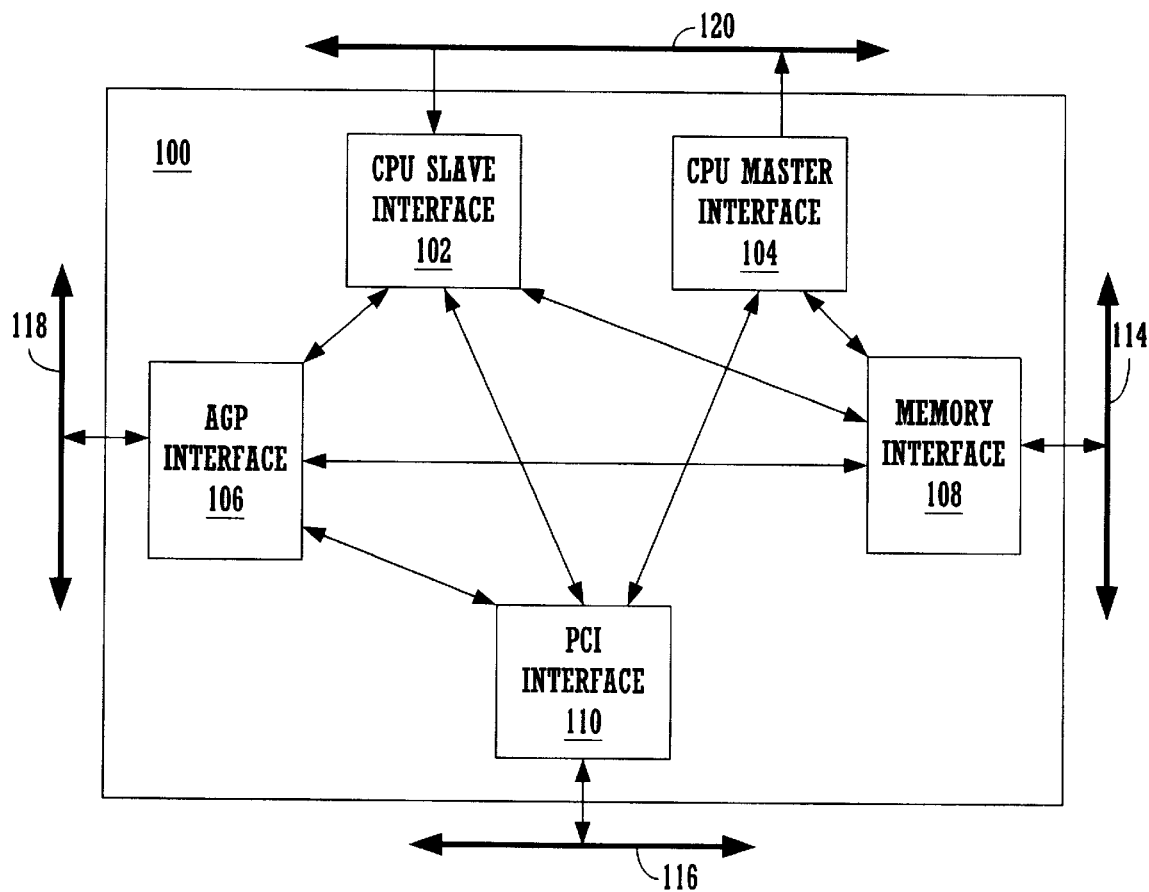
FIG. 1 is a block diagram of an example of a prior art North Bridge design used to interconnect buses within a computer system.

In the following detailed description of the present invention, an optimized CPU-memory high bandwidth multibus structure supporting design reusable blocks, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

A computer system can be fabricated from a wide variety of individual components and devices which enable it to operate and perform many desirable functions. Some of the internal components of a computer system can include a central processing unit (CPU), a computer readable volatile memory unit (e.g., random access memory, static RAM, dynamic RAM, etc.), a computer readable non-volatile memory unit (e.g., read only memory, programmable ROM, flash memory, EPROM, EEPROM, etc.), a computer readable mass data storage device such as a magnetic or optical desk, modem device, graphics hardware, sound hardware, and the like. Furthermore, some of the peripheral devices of a computer system, which increase its overall functionality, can include a display device, a keyboard for inputting alphanumeric characters, a cursor control device (e.g., mouse), a printer, a scanner, speakers, and the like. Of all the many and diverse components and devices that constitute a computer system, the CPU is its most important functional component. The CPU is made up of circuitry which receives and interprets instructions and then controls their execution within itself or within the other internal components and peripheral devices of the computer system.

Since the CPU is so critical to the operation of the other internal components and peripheral devices of the computer system, it is necessary to couple the CPU to these various components. Within the present invention, there are techniques for coupling the CPU to the various components that constitute the computer system. One embodiment of the present invention is a scaleable, high performance architecture for North Bridge chips which promotes design reuse of various modules located within North Bridge chips.

The advantages of the present invention is that its architecture is able to adapt to different CPUs with minimal changes. Furthermore, the architecture is flexible enough to enable redesign and improvement of the CPU to memory path without affecting the other modules within a North Bridge chip. Moreover, the architecture has the ability to easily add new modules with minimal change to the rest of the design. It should be appreciated that the present invention is not limited to use within North Bridge chips. The present invention is also well suited to interconnect a CPU(s) of a computer system to its other internal components and peripheral devices.

Dual Bus Approach

Figure 2:
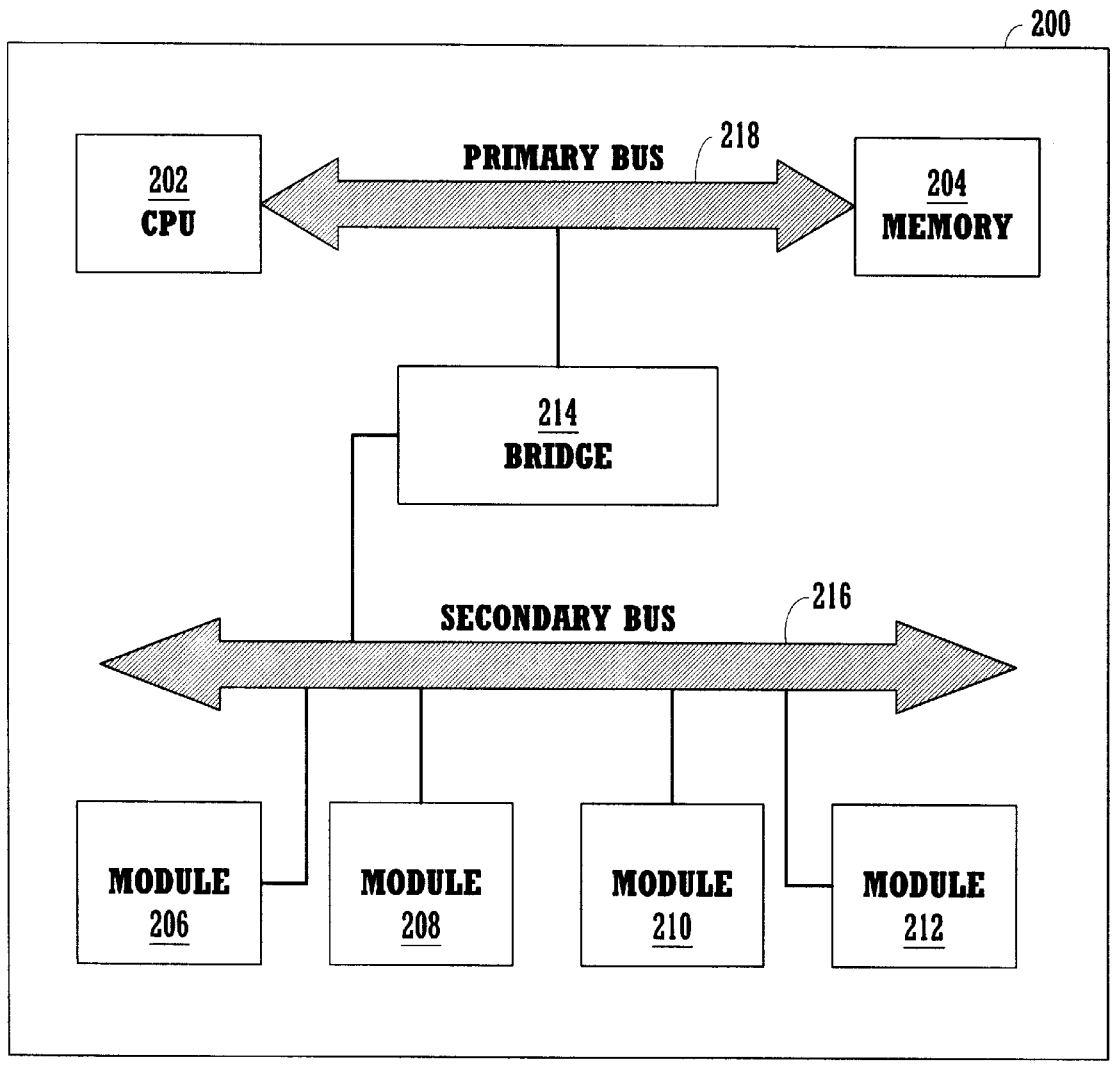
FIG. 2 is a simplified block diagram of one embodiment of a North Bridge design divided into two distinct regions, in accordance with the present invention.

FIG. 2 is a simplified block diagram of one embodiment of a North Bridge chip 200, in accordance with the present invention, divided into two distinct regions. A primary bus 218 connects a CPU 202 to memory module 204, while a secondary bus 216 connects modules 206–212 to a bridge module 214. Secondary bus 216 is scaleable and enables the addition of new modules, while only requiring changes within bridge module 214. In this way, the modules connected to secondary bus 216 are isolated from any change in the frequency or width of primary bus 218. Furthermore, primary bus 218 is isolated from any required changes due to the addition of new modules to secondary bus 216.

Modules 206–212 of FIG. 2, which are connected to secondary bus 216, are all designed to follow the specification of secondary bus 216 and are designed to act as a single port master and a single port slave device. In this way, if a new module is connected to secondary bus 216, the design of the existing modules (e.g., 206–212) to which the new module is capable of communicating with do not need to change.

Based on the requirements of modules 206–212 of FIG. 2, an embodiment of secondary bus 216 can be flexibly designed in accordance with the present invention. For example, within an embodiment of secondary bus 216, modules 206–212 are made to share common tri-state (separate) address and data buses. At a more complex level, an embodiment of secondary bus 216 can be implemented as a crossbar switch. Any changes to secondary bus 216 are transparent to modules 206–212, and changing the connection scheme is achieved by changing the design of bridge module 214. It should be appreciated that any one of modules 206–212 can also act as a bridge to another bus, e.g., peripheral component interconnect (PCI) bus. In this manner, components and devices that interface with that bus can be connected to secondary bus 216, which makes the architecture more scaleable.

Secondary Bus Definition

One embodiment of the definition of secondary bus 216 of FIG. 2, in accordance with the present invention, provides a high performance bus having a high bandwidth. Furthermore, it also enables design reusability of the modules.

Protocol Description

Each module (e.g., 206–212 of FIG. 2) connected to secondary bus 216 is defined within the present embodiment to have as many as two ports, which include a master port and a slave port. Furthermore, each module is defined to only interface with bridge module 214. Bridge module 214 is responsible for forwarding cycles from primary bus 218 to modules 206–212, which are connected to secondary bus 216. Furthermore, bridge module 214 is responsible for forwarding address and data cycles from one module to another module connected to secondary bus 216. Moreover, bridge module 214 is responsible for forwarding address and data cycles from modules 206–212 on secondary bus 216 to primary bus 218. The bridge module 214 provides point-to-point communication paths between the modules for control handshake signals.

Figure 3:
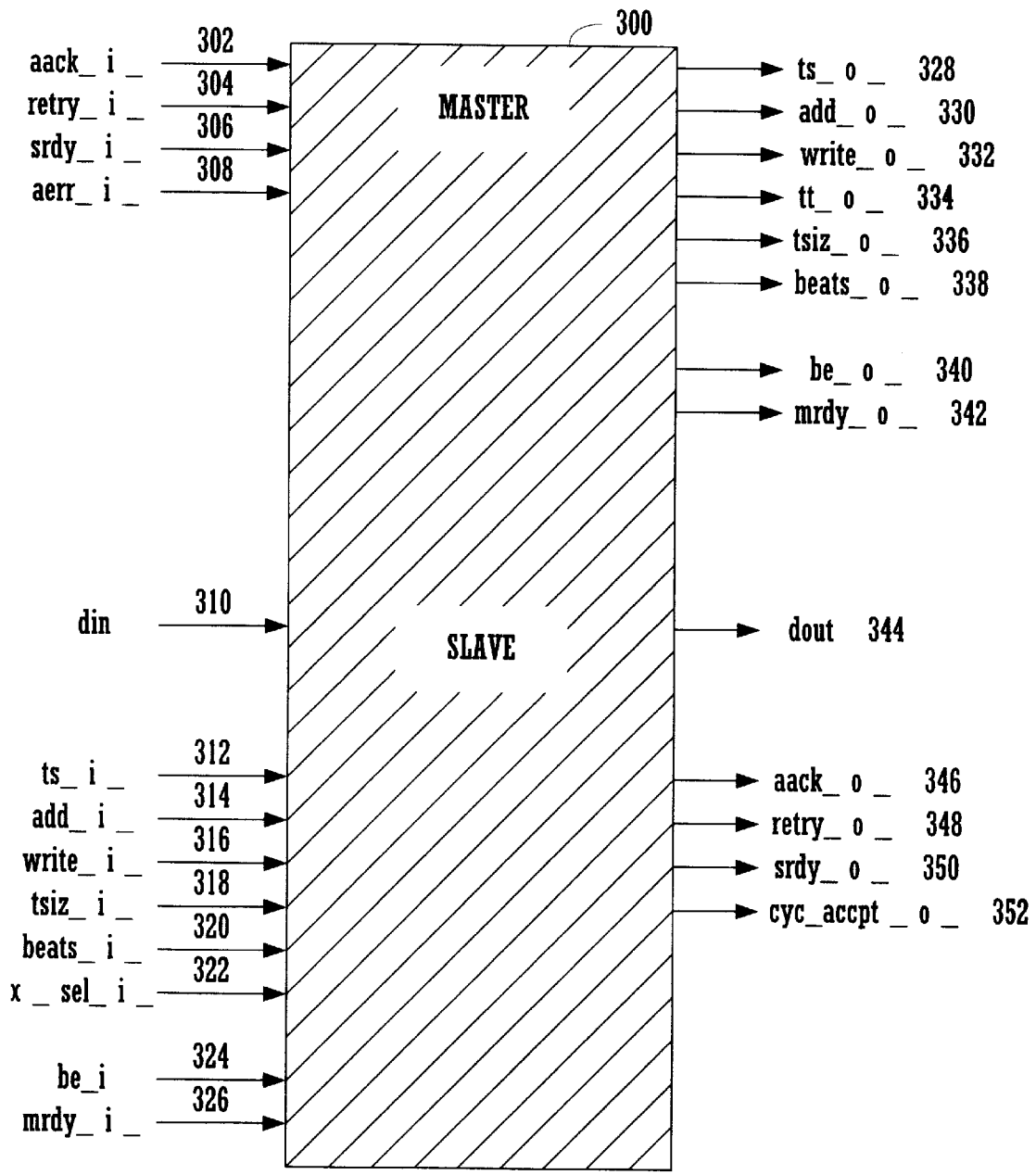
FIG. 3 is a block diagram of a module, which can function as both a master and slave, that would be connected to the secondary bus of FIG. 2.

Within the present embodiment, as shown in FIG. 3 a master port of a module 300 is defined as one which is capable of generating read or write cycles to another module. A slave port of a module is one which is capable of accepting a read and/or write cycle from another module. It should be appreciated that each module only has one master port, irrespective of the number of modules it is capable of accessing. The slave port only interfaces with bridge module 214, thus making it unaware of the identity of the generating master of any transaction.

Within the present embodiment, the secondary bus interface signals for modules are categorized as input or output signals and are further divided into five sections which include address group signals for a master, address group signals for slaves, data group signals for a master, data group signal for a slave, and data group signal for both a master and a slave. It should be appreciated that the 3 digit number which follows each signal name abbreviation below is used to identify these signals within figures which will be described later.

Signal Description

The following signal descriptions are one embodiment, in accordance with the present invention, of the definitions of the address group signals for a master port.

Output Signal Name: Transfer Start (ts_o_) 328
Active: Low
Output: 0
State Meaning: This signal indicates that a master port has started a bus transaction and that the address and other parameters on the address group are valid.
Timing: Driven valid on the cycle with all other address group signals. Asserted for one clock. The reason that it is a strobe is to allow transfers having no wait states. it was a steady high signal that remained high, it would not be possible to have transfers having no wait states. This signal cannot be driven again until the 'aerr_', 'retry_', or 'aack_' signal is sampled.

Output Signal Name: Address (add_o) 330
Active: Not applicable
Output: 0
State Meaning: This signal specifies the address of the transaction. The width is dependent on the master. Master cannot assume any address translation by the slave based on the source of the transaction. The transaction can however be assumed if the slave is known to support it independent of the source of the transaction.
Timing: Driven valid on the same cycle as 'ts_' is asserted and remains valid during the address phase of the transaction. Invalid one bus clock after 'aack_' is asserted.

Output Signal Name: Cycle Type (write_o) 332
Active: High
Output: 0
State Meaning: When this signal is asserted, it indicates a write cycle. Conversely, when this signal is negated, it indicates a read cycle.
Timing: Same timing as 'add_o' 330, as described above.

Output Signal Name: Transfer Type (tt_o) 334
Active: Not applicable
Output: 0
State Meaning: This signal specifies the coherency of the transaction. For example, see FIG. 8. There are 2 lines which indicate what type of coherency is required.
Timing: Same timing as 'add_o' 330, as described above.

Output Signal Name: Transfer Size (tsiz_o) 336
Active: Not applicable
Output: 0
State Meaning: Secondary bus 216 can support multiple beat cycles and single beat cycles. If it is a single beat cycle, this signal indicates the number of bytes to be transferred for a single beat cycle and it invalid for multiple beat cycles. The slave can use 'tsiz' along with 'add_o' 330 to decode the byte enables for the cycle.
For example, see FIG. 10. It should be appreciated that the width of secondary bus 216 is 8 bytes within one embodiment of the present invention.
Timing: Same timing as 'add_o' 330, as described above.

Output Signal Name: Number of Beats (beats_o) 338

Active: Not applicable
Output: 0
State Meaning: This signal indicates the number of beats in the data transfer and the beats cannot exceed Cache Line Size/8
Timing: Same timing as 'add_o' 330, as described above.
Output Signal Name: Mem/IO/Config (mic_o) 354
Active: High
Output: 0
State Meaning: There are 3 lines which indicate the space that the cycle maps into, either the memory, the configuration space, or the input/output space. There is a flat address map within the chip for each space.
Timing; Same timing as 'add_o' 330, as described above.
Input Signal Name: Address Acknowledge (aack_i_) 302
Active: Low
Output: 1
State Meaning: This is the signal that is received from the slave indicating it saw the cycle from the master, it will execute the cycle, and the master can remove its address request. In other words, it indicates that the address phase is over. Until the address acknowledge is received by the master, it maintains all of the other lines and it cannot change the lines once it has asserted 'ts_'.
Timing: Assertion may occur as early as the clock signal following 'ts_' and is active for one clock only. Assertion may be delayed indefinitely to extend the address tenure. The address phase actually occurs between a 'ts_' sample asserted and an address acknowledge sample asserted.
Input Signal Name: Retry (retry_i_) 304
Active: Low
Output: 1
State Meaning: This signal indicates to the master that the slave wants the cycle to be retried. There is no data phase associated with this cycle.
Timing: Driven during an address tenure. Is asserted for one clock only.
Input Signal Name: Address Error (aerr_i_) 308
Active: Low
Output: 1
State Meaning: This signal indicates to the master that there was an irrecoverable error associated with the cycle and the cycle is considered terminated. This signal comes from a controller, and indicates that the address the master generated is not mapped to any device and the master should not generate this address again.
Timing: Driven valid for one clock before the assertion of 'aack_' or 'retry_'.

The following signal descriptions are one embodiment, in accordance with the present invention, of the definitions of the address group signals for slaves.
Input Signal Name: Transfer Start (ts_i_) 312
Active: Low
Output: 1
State Meaning: This signal indicates that a master has started a bus transaction and that the address and other parameters on the address group are valid. The slave latches all the address group signals on detecting 'ts_' and 'mod_sel_' active.
Timing: Driven valid on the cycle with all other address group signals. Asserted for one clock only.
Input Signal Name: Address (add_i) 314
Active: Not applicable
Output: 1
State Meaning: This signal specifies the address of the transaction. The width is dependent on master. Master cannot assume any address translation by the slave based on the source of the transaction. The translation can however be assumed if the targeted slave is known to support it independent of the source of the transaction.
Timing: Valid only in clock of 'ts_i_' if 'mod_sel_i_' is sampled asserted else valid between 'ts_i_' and slave's assertion of 'cyc_accpt_o_'.
Input Signal Name: Cycle Type (write_i) 316
Active: High
Output: 1
State Meaning: When this signal is asserted, it indicates a write cycle. Conversely, when this signal is negated, it indicates a read cycle.
Timing: Same timing as 'add_i' 314, as described above.
Input Signal Name: Transfer Size (tsiz_i) 318
Active: Not applicable
Output: 1
State Meaning: This signal indicates the number of bytes to be transferred for a single beat cycle. The slave can use 'tsiz' along with 'add_i' to decode the byte enables for the cycle. See FIG. 10 for more details.
Timing: Same timing as 'add_i' 314, as described above.
Input Signal Name: Number of Beats (beats_i) 320
Active: Not applicable
Output: 1
State Meaning: This signal indicates the number of beats in the data transfer and beats do not exceed Cache Line Size/8 in one implementation.
Timing: Same timing as 'add_i' 314, as described above.
Input Signal Name: Mem/IO/Config (mic_i) 356
Active: High
Output: 1
State Meaning: There are 3 lines which indicate the space that the cycle maps into, either the memory, the configuration space, or the input/output space. There is a flat address map within the chip for each space.
Timing: Same timing as 'add_i', as described above.
Input Signal Name: Module Select (mod_sel_i_) 358
Active: Low
Output: 1
State Meaning: This signal specifies target module for the cycle and tells it to execute the cycle.
Timing: Same timing as 'add_i' 314, as described above.
Output Signal Name: Address Acknowledge (aack_o_) 346
Active: Low
Output: 0
State Meaning: This is the signal that is sent to the master and indicates that the slave saw the cycle from the master, the slave will execute the cycle, and the master can remove its address request. In other words, it indicates that the address phase is over.
Timing: Assertion may occur as early as the clock signal following 'ts_'. Is active for one clock only. Assertion may be delayed indefinitely to extend the address tenure.
Output Signal Name: Retry (retry_o) 348
Active: Low
Output: 0
State Meaning: This signal indicates to the master that the slave wants the cycle to be retried.
Timing: Driven during an address tenure. Is asserted for one clock only.
Output Signal Name: Cycle Accept (cyc_accpt_o_) 352
Active: Low
Output: 0
State Meaning: This signal indicates that the module has decoded its address as the target of the current access and will execute the cycle.
Timing: Is driven no later than 3 clock signals from the sampling of an active 'ts_i_' and inactive 'mod_sel_i_'.

The following signal descriptions are one embodiment, in accordance with the present invention, of the definitions of the data bus group signals for a master port.

Output Signal Name: (be_o_) 340
Active: Low
Output: 0
State Meaning: This signal represents the state of the active data byte lines on a data transfer cycle.
Timing: Same timing as 'dout' or 'din', which are both described below.

Output Signal Name: Master Ready (mrdy_o_) 342
Active: Low
Output: 0
State Meaning:
  Asserted: it indicates that the master has provided or accepted the data from the slave.
  Negated: It indicates data transfers may not continue on the bus. Any 'srdy_' detected by the master is ignored by the master and the slave may not advance to the next state.
Timing:
  Assertion: May occur during any cycle of the data transaction. The data lines consist of valid data for write transactions.
  Negation: Once asserted, it is not de-asserted until the end of the data transfer.

Input Signal Name: Slave Ready (srdy_i_) 306
Active: Low
Output: 1
State Meaning:
  Asserted: It indicates that the slave has provided or accepted the data from the master. For a read transaction 'srdy_' is asserted on the same cycle as the valid data is ready on the data bus. The master may copy the data on the same clock. Master and slave assume a transfer of data on clock cycles that sample 'srdy_' and 'mrdy_' asserted true.
  Negated: It indicates the slave has inserted wait states.
Timing:
  Assertion: May occur during any cycle of the data transaction. This signal may also be held active to transfer multiple data beats during a burst transfer. The data lines consists of valid data.
  Negation: Can occur on any clock signal to insert wait states.

The following signal descriptions are one embodiment, in accordance with the present invention, of the definitions of the data bus group signals for a slave port.

Input Signal Name: (be_i_) 324
Active: Low
Output: 1
State Meaning: This signal represents the state of the active data byte lines on a data transfer cycle.
Timing: Same timing as 'dout' or 'din', which are both described below.

Input Signal Name: Master Ready (mrdy_i_) 326
Active: Low
Output: 1
State Meaning:
  Asserted: It indicates the master has provided or accepted the data from the slave.
  Negated: It indicates data transfers may not continue on the bus. Any 'srdy_' detected by the master is ignored by the master and the slave may not advance to the next state.
Timing:
  Assertion: May occur during any cycle of the data transaction.
  Negation: Once asserted, the signal cannot be de-asserted until the end of the data transfer.

Output Signal Name: Slave Ready (srdy_o_) 350
Active: Low
Output: 0
State Meaning:
  Asserted: It indicates the slave has provided or accepted the data from the master. For a read transaction 'srdy_' is asserted on the same cycle as the valid data is ready on the data bus. The master may copy the data on the same clock. Master and slave assume a transfer of data on clock cycles that sample 'srdy_' and 'mrdy_' asserted true.
  Negated: It indicates the slave has inserted wait states.
Timing:
  Assertion: May occur during any cycle of the data transaction. This signal may also be held active to transfer multiple data beats during a burst transfer. The data lines consist of valid data.
  Negation: Can occur on any clock signal to insert wait states.

The following signal descriptions are one embodiment, in accordance with the present invention, of the definitions of the data phase signals for both a master and a slave.

Signal Name: Data Input (din) 310
Active: Not applicable
Output: 1
State Meaning: In one implementation, there are 64 data lines which are shared by a master and a slave, so there is a 64 bit data input. The signal 'din' contains read data if the module is acting as a master and write data if the module acts as a slave.
Timing: A data transfer occurs on the cycle where both 'mrdy_' and 'srdy_' are active.

Signal Name: Data Output (dout) 344
Active: Not applicable
Output: 0
State Meaning: In one implementation, there are 64 data lines which are shared by a master and a slave, so there is a 64 bit data output. The signal 'dout' contains read data if the module is acting as a slave and write data if the module is acting as a master.
Timing: A data transfer occurs on the cycle where both 'mrdy_' and 'srdy_' are active.

The following signal descriptions are one embodiment, in accordance with the present invention, of the definitions of the central services signals.

Signal Name: Clock (clk) 360
Output: 1
State Meaning: Clock input for the module. All timing on the secondary bus is referenced to this clock.
Timing: Free running in normal mode. Can be held in logic level low if both 'qreq_' and 'qack_' are asserted, which are both described below.

Signal Name: Reset (reset_) 362
Output: 1
State Meaning: Assertion of this signal indicates that modules should enter idle state and all inputs should be ignored.
Timing: May be asserted or de-asserted on any cycle synchronous to 'clk'.

Signal Name: Quiescent Clock (qclk) 364
Output: 1
State Meaning: Used as a clock to reference the signals 'qreq_' and 'qack_', which are described below.
Timing: Not Applicable.
Signal Name: Quiescent Request (qreq_) 366
Output: 1
State Meaning: Assertion of this signal indicates that the module should terminate or pause all activity so that the chip may enter a quiescent (or a low power) state.
Timing: May be asserted or de-asserted on any cycle synchronous to 'qclk' 364.
Signal Name: Quiescent Acknowledge (qack_) 368
Output: 0
State Meaning: This signal indicates that the module has ceased all activity and is ready to enter into a quiescent state.
Timing: May be asserted or de-asserted on any cycle synchronous to 'qclk' 364.

FIG. 3 is a block diagram of a module 300, which can function as both a master and slave, and would be connected to secondary bus 216 of FIG. 2. Module 300 has separate input and output data pins which are shared by the master and slave ports. All the other control signals in module 300 are point-to-point.

Transaction Ordering

The transaction ordering rules of the present embodiment are able to satisfy write results ordering requirements, allow for posting of transactions to improve performance, and to prevent the occurrence of deadlocks. For more information, please refer to 'Section 3.2.5' and 'Appendix E' of PCI Local Bus Specification Revision 2.1.

Summary of the Transaction Ordering Rules

The transaction ordering rules of the present embodiment can be summarized into four statements. The first rule defines that if a write cycle is pending in either direction, the module should not accept a read cycle from the opposite direction. The second rule defines that if the master has to issue a write cycle, it should 'retry_' any read cycle issued to it as a slave. The slave should not assume that it can add wait states to the read cycle until the completion of the write cycle. It should be appreciated that this is done to avoid having deadlocks as the read could be from the CPU which could block a snoop write back for the line to be written. The third rule defines that if a module accepts a cycle as a slave, it cannot make the completion of the cycle conditional on the completion of a cycle it issued as a master. The reason for this is that it can lead to deadlocks. The forth rule defines that modules which have the capability to generate external 'interrupts' implement their control registers within the module itself and not in a physically different module.

Transfer Protocol

There is a particular transfer protocol associated with the present embodiment of the secondary bus. For example, cycles on the secondary bus are divided into address and data tenures. Each tenure has transfer and termination phases. The address and data tenures are independent of each other.

Address Transfer Phase

Figure 4:
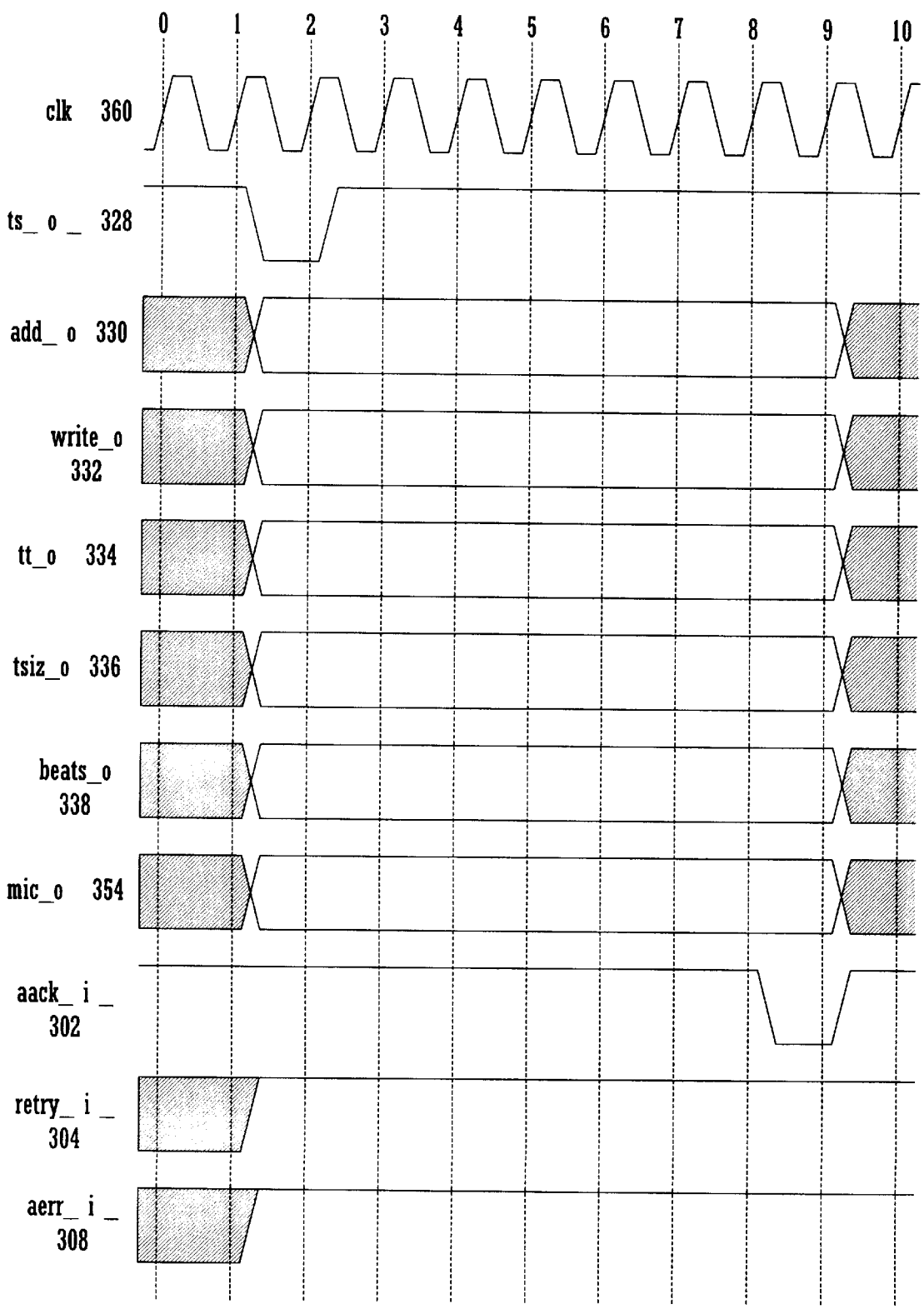
FIG. 4 is a timing diagram showing the address group signals as seen by a master module during an address phase.
Figure 5:
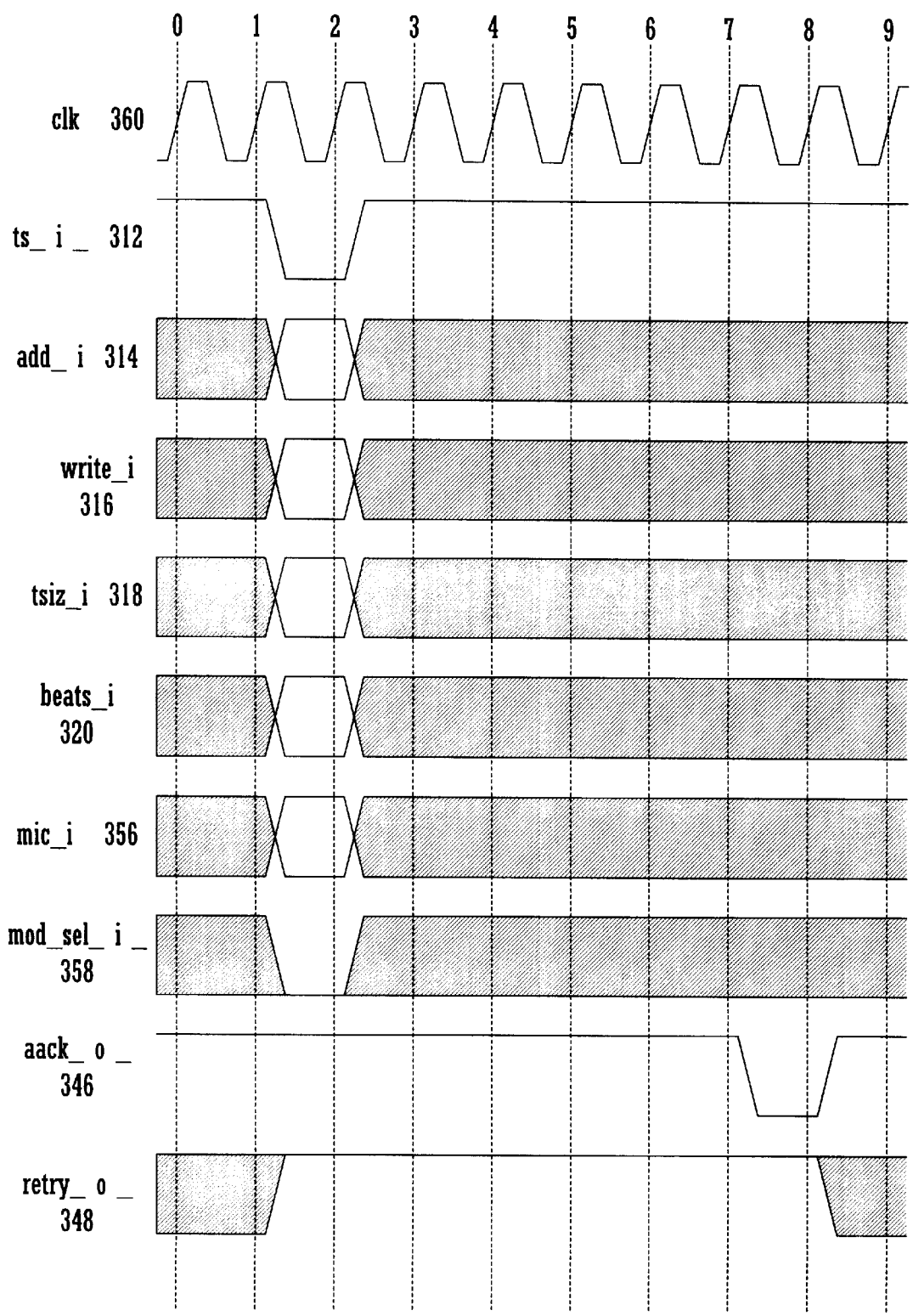
FIG. 5 is a timing diagram showing the address group signals as seen by a slave module for address decoding when the 'module select' signal is sampled as asserted in the same clock signal as the 'transfer start' signal.
Figure 6:
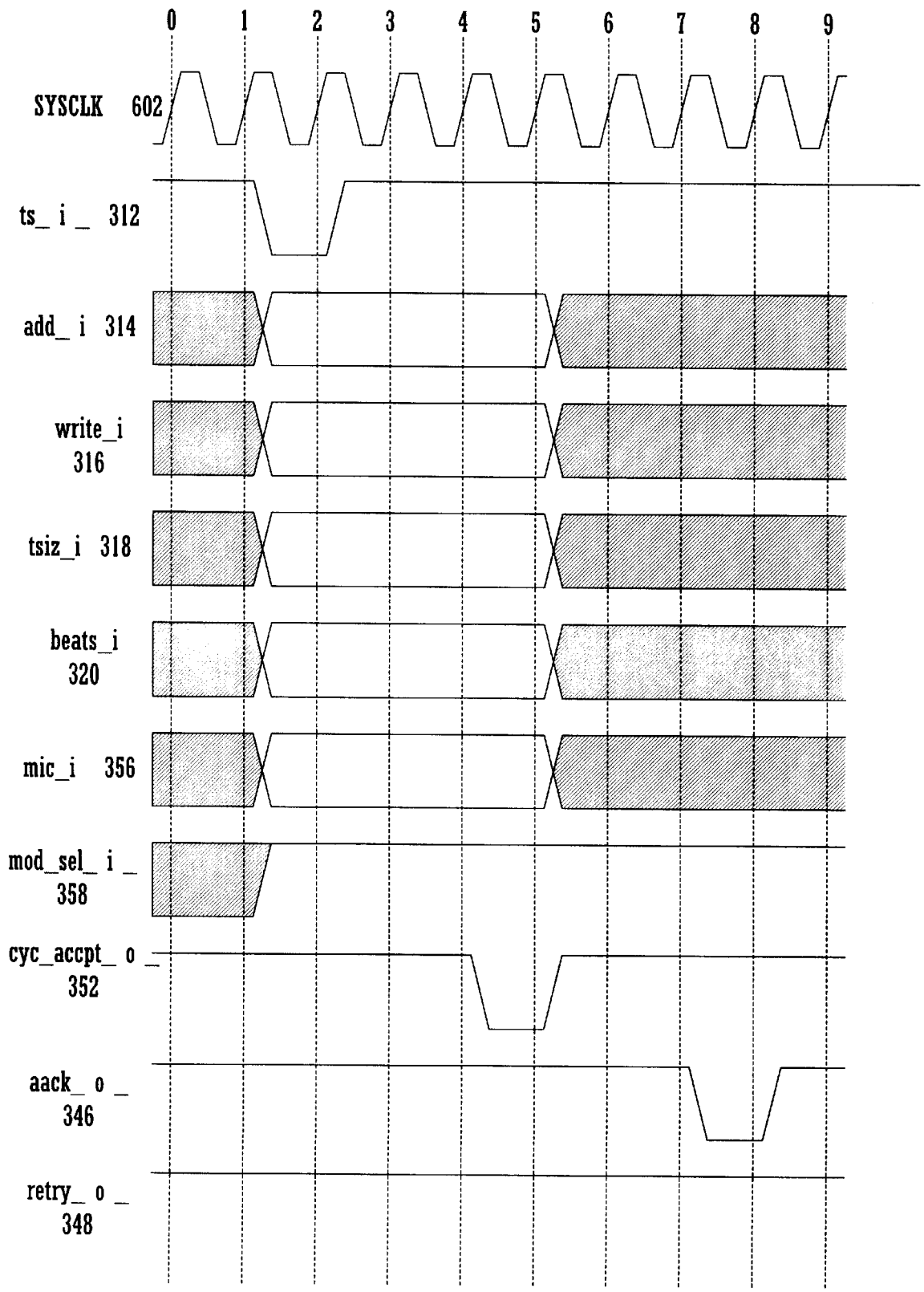
FIG. 6 is a timing diagram showing the address group signals as seen by a slave module for address decoding when the 'module select' signal is sampled as de-asserted in the same clock signal as the 'transfer start' signal.

During the address transfer phase, the physical address and the transfer attributes are transferred from the master module to the slave module. FIG. 4 is a timing diagram showing the address group signals as seen (e.g., output and received) by a master module. The signal 'ts_o_' 328 commences the address phase and the signal 'aack_i_' 302 terminates the address phase. FIG. 5 is a timing diagram showing the address group signals as seen by a slave module for the address phase of FIG. 4 when 'mod_sel_i_' 358 is sampled asserted in the same clock signal as 'ts_i_' 312. The slave is required to latch all the address group signals on sampling 'ts_i_' 312 and 'mod_sel_i_' 358 asserted. The signal 'ts_i_' 312 commences the address phase and the signal 'aack_o_' 346 terminates the address phase. FIG. 6 is a timing diagram showing the address group signals as seen by a slave module for the address phase of FIG. 4 but when 'mod_sel_i_' 358 is sampled de-asserted in the same clock signal as 'ts_i_' 312. In this case, the slave module drives the signal 'cyc_accpt_o_' 352 within three clocks of sampling 'ts_i_' 312 to indicate that the slave has decoded its address as the target of the current access. The signal 'ts_i_' 312 commences the address phase and the signal 'aack_o_' 346 terminates the address phase.

Address Space

Secondary bus 216 of FIG. 2 supports three main kinds of address space, namely memory, input/output (I/O), and configuration. Secondary bus 216 also defines a reserved address space 'special' for cycles that cannot be categorized in any of the other three spaces, e.g., read only memory (ROM) cycles in certain implementations. Some implementations may not allow master modules to generate configuration cycles on secondary bus 216. Use of the special address space is restricted to bridge module 214. Secondary bus 216 supports a flat address map of each of the spaces, e.g., for any particular space, all the modules see the same address map. FIG. 7 is a table of an exemplary encoding for the address space of secondary bus 216 within the present embodiment.

Within the present invention, transfer attributes include transfer type signals, transfer size and number of beats. The transfer type signals, of the present embodiment, indicate the coherency of the transaction in progress. Within FIG. 8, the 'tt' signal description provide details of the signals. For cycles that are marked as "Non Coherent" within FIG. 8, no snooping needs to be performed on the CPU bus. A "Coherent Read with intent to Modify" indicates that the snoop cycle generated should be such that all caches flush the corresponding entry. A "Coherent Write to Invalidate" indicates that the generating master is guaranteeing that it would overwrite the entire cache line in the target slave.

The 'beats' signal is used to indicate the number of data beats of the current cycle. Within the present embodiment, the maximum number of beats cannot exceed "Cache Line Size/8". FIG. 9 is a table of an exemplary encoding of 'beats' for the number of beats.

The transfer size signal is used to convey, for single beat cycles the number of bytes to be transferred. The master does not generate any misaligned transfers unless it is supported by the targeted slave. FIG. 10 is a table of an exemplary encoding of 'tsiz' for the number of bytes.

Address Transfer Termination

The address tenure is terminated using any one of the signals 'aack_', 'aerr_', or 'retry_'. Only one of these signals can be used to terminate the cycle and until sampled, the master continues with the address phase. The agents responsible for driving the signals are the target module, which drives the signals 'aack_' and 'retry_', and a central resource which drives the signal 'aerr_'.

Normal Termination

Within the present embodiment, a target module indicates a successful termination of the address phase by asserting 'aack_'. Assertion of 'aack_' by the target also indicates that it is ready to accept another address. To take advantage of pipelining, the target asserts 'aack_' before starting the data phase associated with the cycle.

Address Error Cycles

If a master generates an address that does not map to any module, an error condition arises. These cycles will be terminated by a central resource by asserting the 'aerr_' signal. The master on detecting 'aerr_' signal, terminates the cycle (both address and data) and forwards the error back to its host bus. A cycle terminated with 'aerr_' is not repeated.

Slave Retry Cycles

Slave modules are allowed to retry cycles issued to it. Slave modules can retry the cycle by asserting a 'retry_' signal for one clock. The slave may use this feature to avoid deadlocks and to conform to coherency requirements.

Data Bus Tenure

Figure 11:
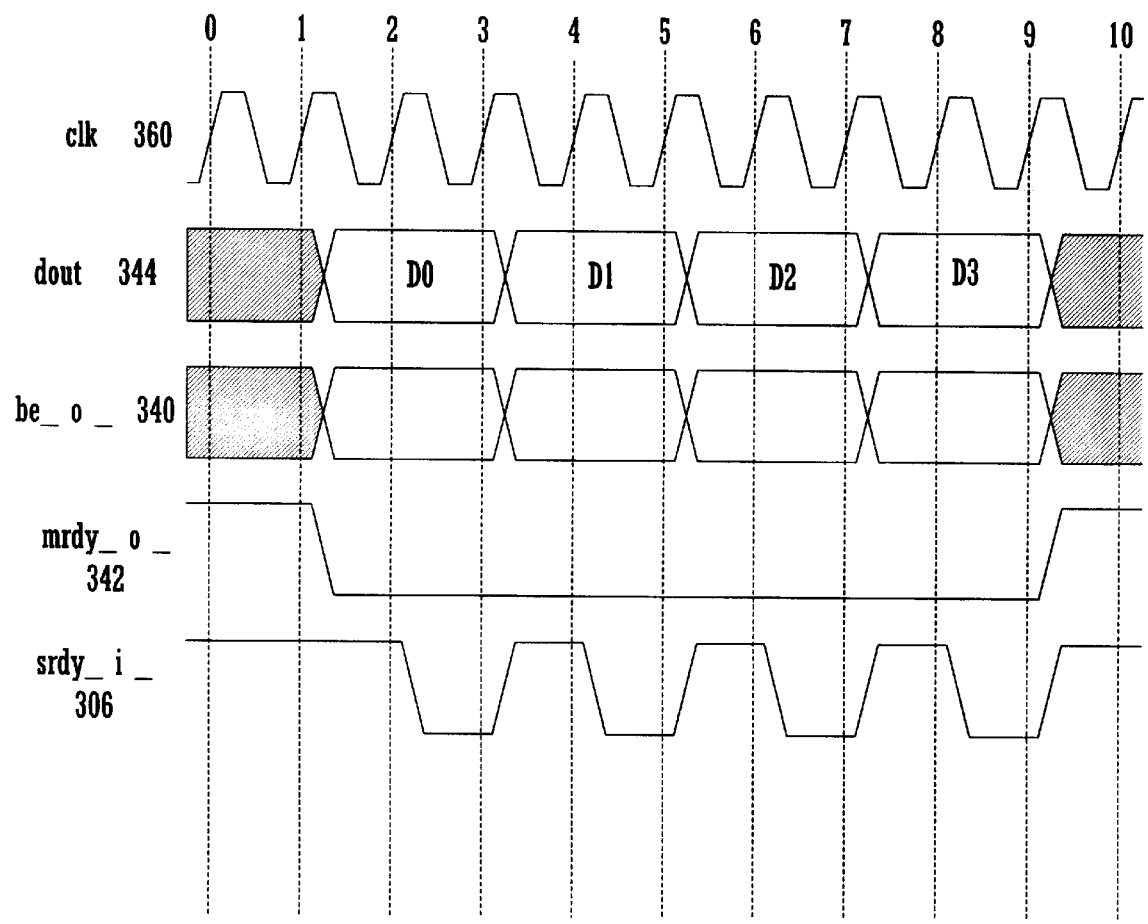
FIG. 11 is a timing diagram showing the data bus signals for masters for a data phase of a write cycle.
Figure 12:
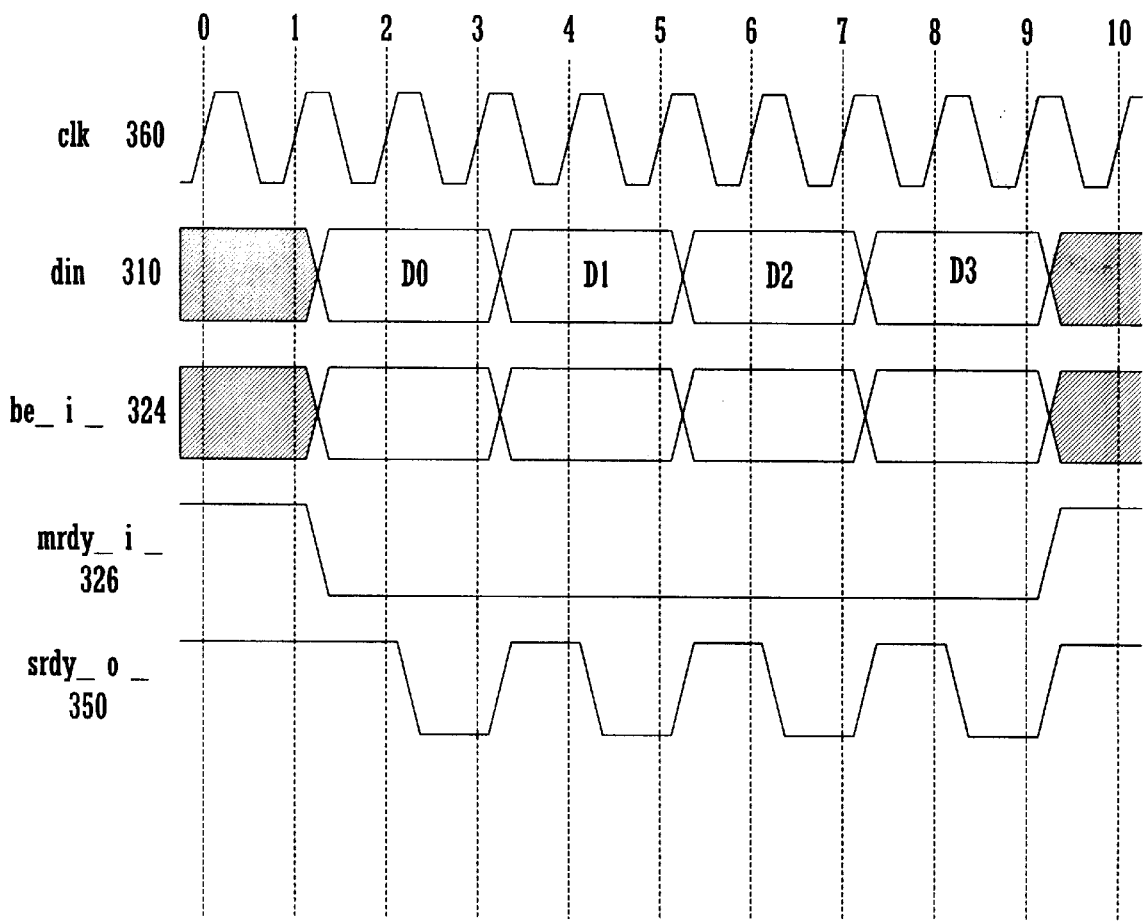
FIG. 12 is a timing diagram showing the data bus group as seen by a target slave for the same write cycle of FIG. 11.

One embodiment of secondary bus 216 of FIG. 2, in accordance with the present invention, supports a 64 bit data bus for all data transfers. The signals used for the data transfer are 'dout' 344 and 'din' 310. FIG. 11 is a timing diagram showing the data bus signals for masters to write cycle. D0–D3 represent the individual beats sent. FIG. 12 is a timing diagram showing the data bus group as seen by targets for the cycle shown in FIG. 11.

The modules of the present embodiment can transfer data in single or multiple beat cycles. For multi-beat transfers, the order of the data returned is linear with wrap around at the cache line boundary. As shown in FIG. 13, the order in which the data is returned depends on the address of the transaction. FIG. 13 is a table that is specific for a burst transfer order for 32 byte cache line size.

Data Termination Phase

The data termination phase of the present embodiment uses the signals 'mrdy_' and 'srdy_' in order to terminate the data tenure. The 'srdy_' signal is used to signal normal termination of the data beat and it is asserted simultaneously with the data being transferred. The data transfer occurs on the clock edge when slave asserts a 'srdy_' and samples a 'mrdy_' asserted on the same clock. The master and slave modules may not advance their data phase until they sample 'mrdy_' and 'srdy_' true on a clock edge.

Power Management

Figure 15:
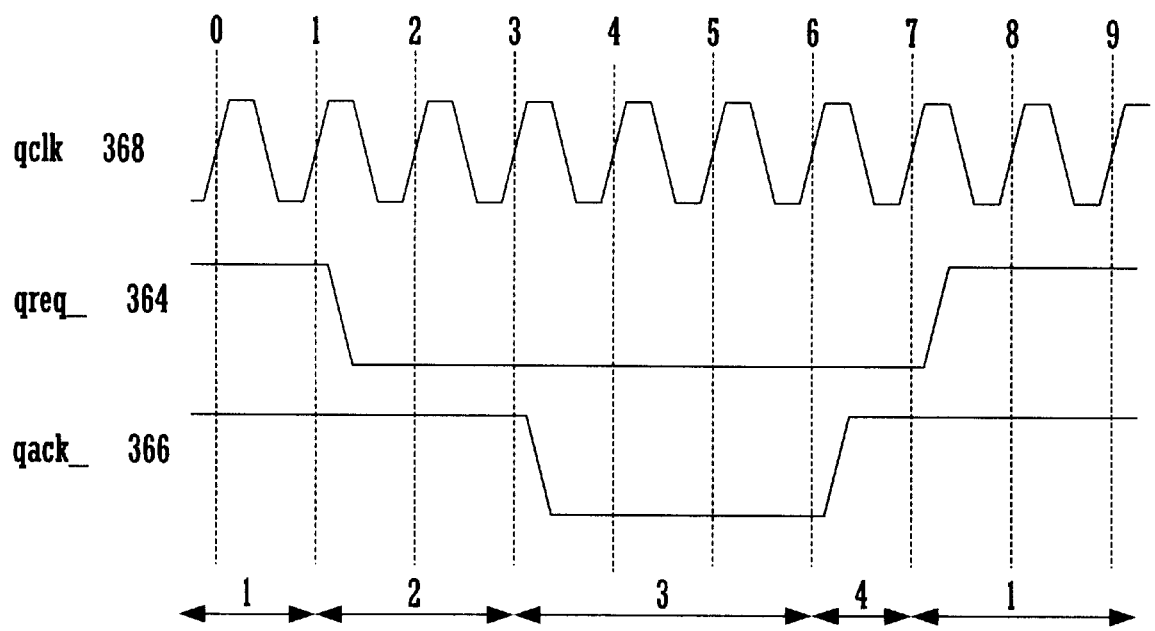
FIG. 15 is a timing diagram showing a module requesting a wake up from the quiescent state.
Figure 16:
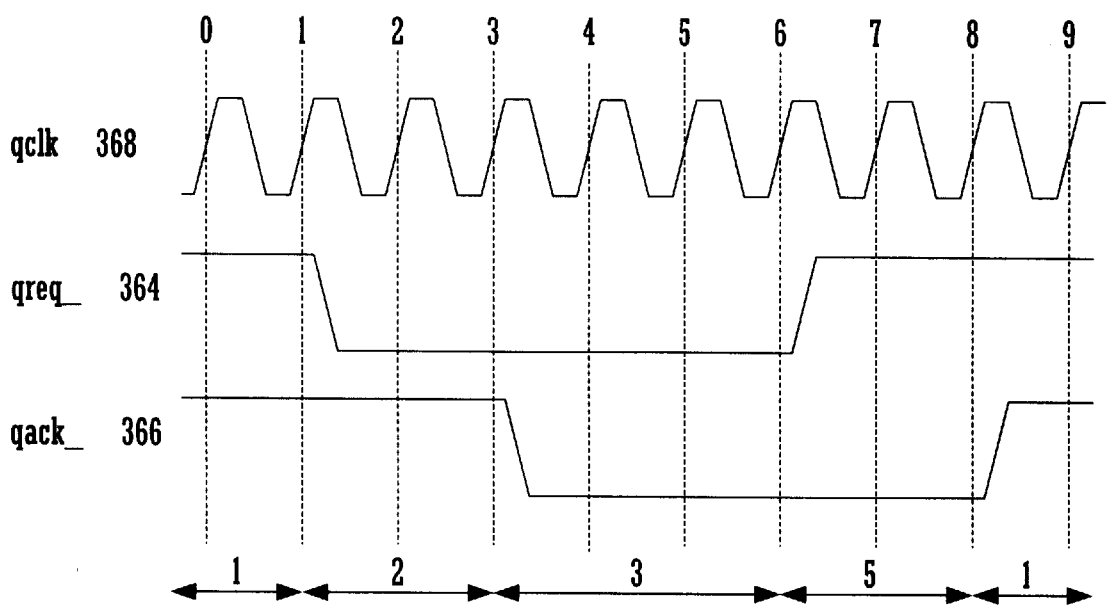
FIG. 16 is a timing diagram showing a module being requested to come back to a power up state by the power management control block.

Within the present embodiment, power management on secondary bus 216 of FIG. 2 is achieved by using signals 'qclk' 368, 'qreq_' 364, and 'qack_' 366. These signals are used by a power management unit to bring the chip into a low power state. On sampling a 'qreq_' 364, a module should complete all outstanding transactions, flush its buffers and stop all external arbitration. On completion of all these events, the module should assert 'qack_' 366. On sampling 'qack_' 366 from a module, the power management unit can shut off all the clocks going to the module. It should be appreciated that the power management unit is responsible for implementing a clock gating scheme. Wake up from the power down state can be triggered by either the module or the power management controller. The various possible stages are shown in FIGS. 14–16.

FIG. 14 is a table showing the stages of power management on secondary bus 216 within the present embodiment. Furthermore, FIG. 15 is a timing diagram showing the module requesting a wake up from the quiescent state. This request is an indicator of some external activity detected by the module. FIG. 16 is a timing diagram showing the module being requested to come back to a power up state by the power management control block.

Timing Examples

Figure 17:
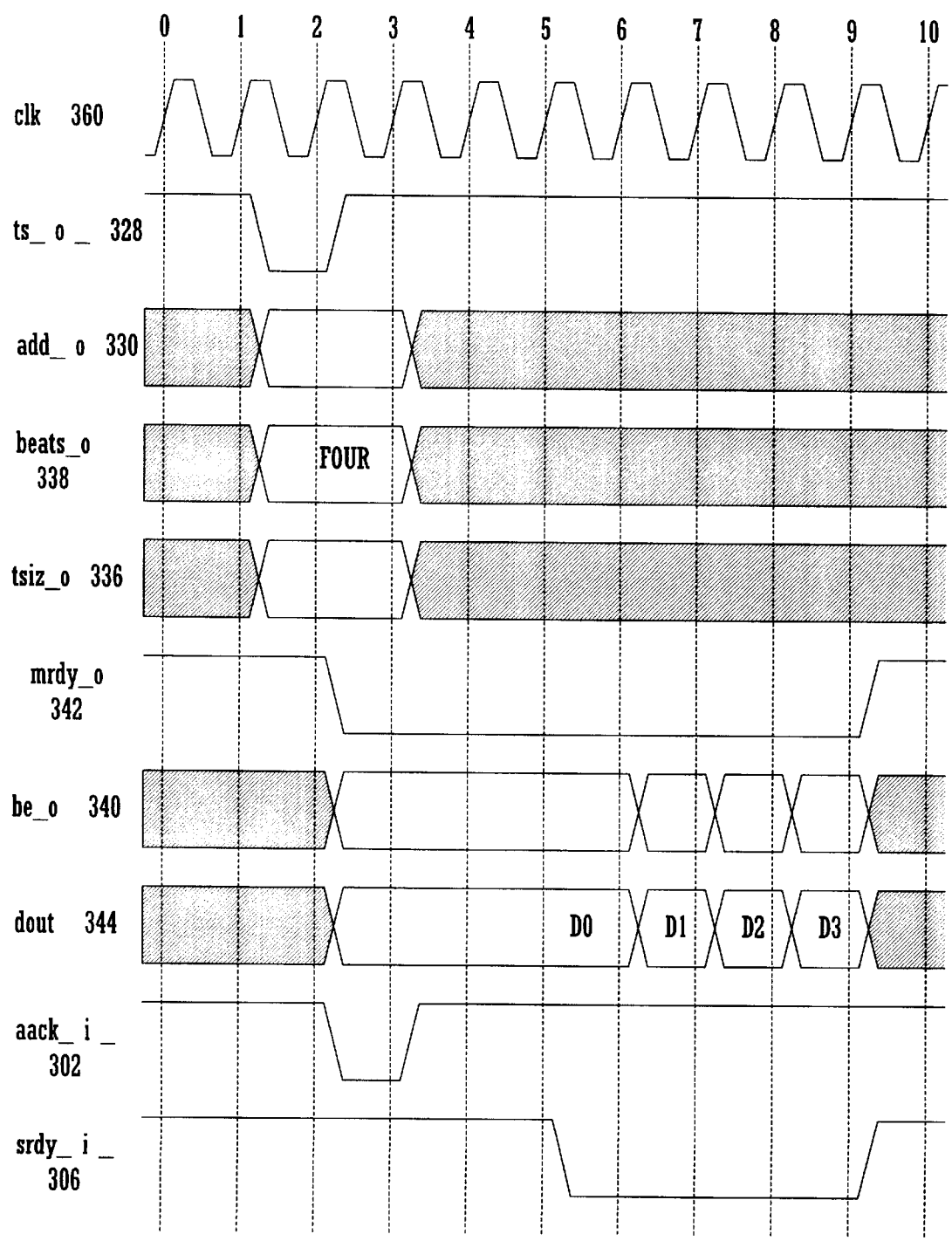
FIG. 17 is a timing diagram showing an example of a write operation with the slave inserting wait states.

FIG. 17 is a timing diagram of the address and data phases of an example of a write cycle with the slave inserting wait states. The slave inserts wait states on the data transfer by delaying assertion of 'srdy_' 306. The master holds the data on the internal data bus until it samples both 'mrdy_o_' 342 and 'srdy_i_' 306 asserted.

Figure 18:
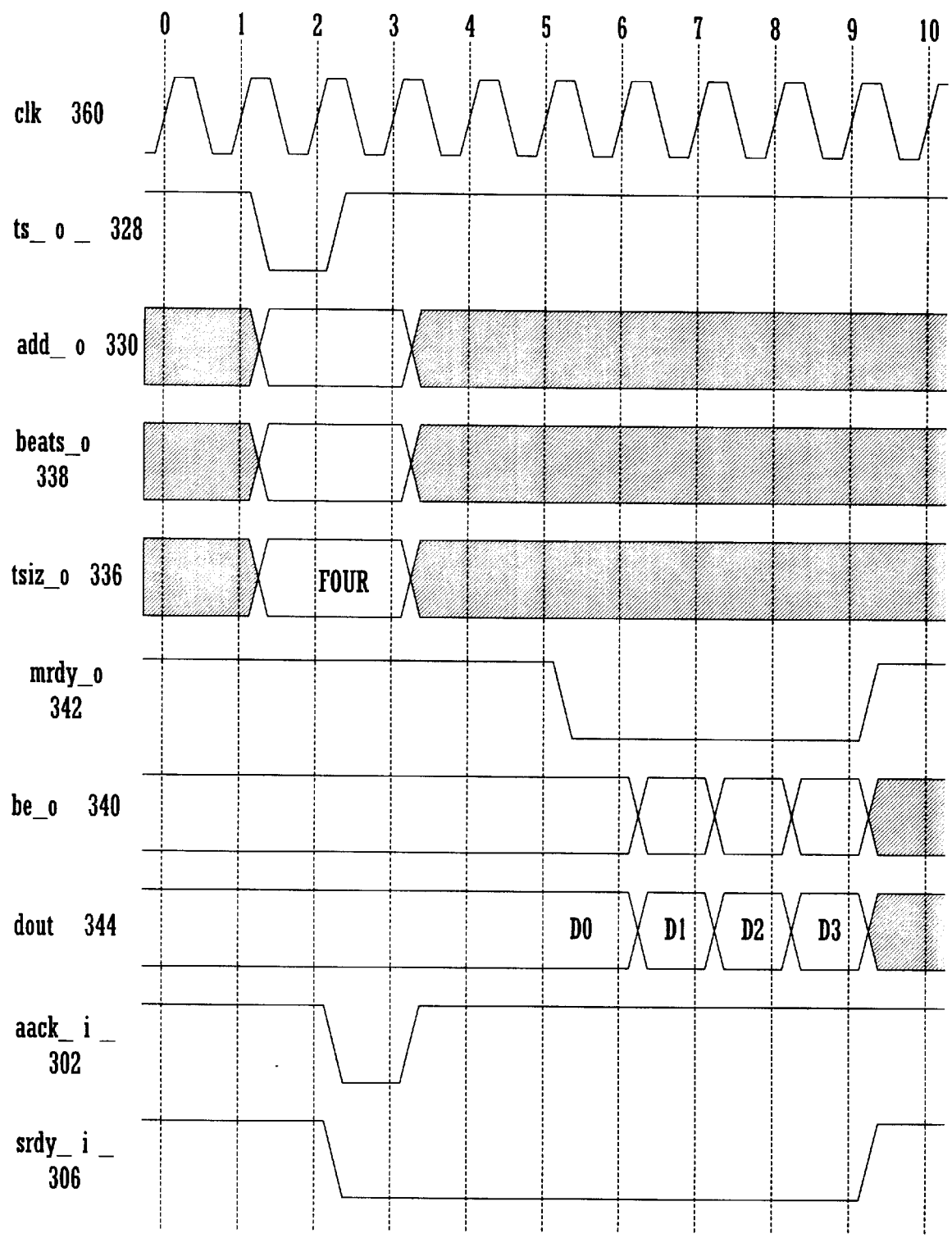
FIG. 18 is a timing diagram showing an example of a write operation with the master inserting wait states by delaying the assertion of the 'master ready' signal.

FIG. 18 is a timing diagram showing the address and data phases of the master inserting wait states by delaying the assertion of the signal 'mrdyo_' 342. The data phase will process when both 'mrdy_o_' 342 and 'srdy_i_' 306 are asserted. The phase will be terminated as soon as the number of data beats encoded in beats is completed.

Figure 19:
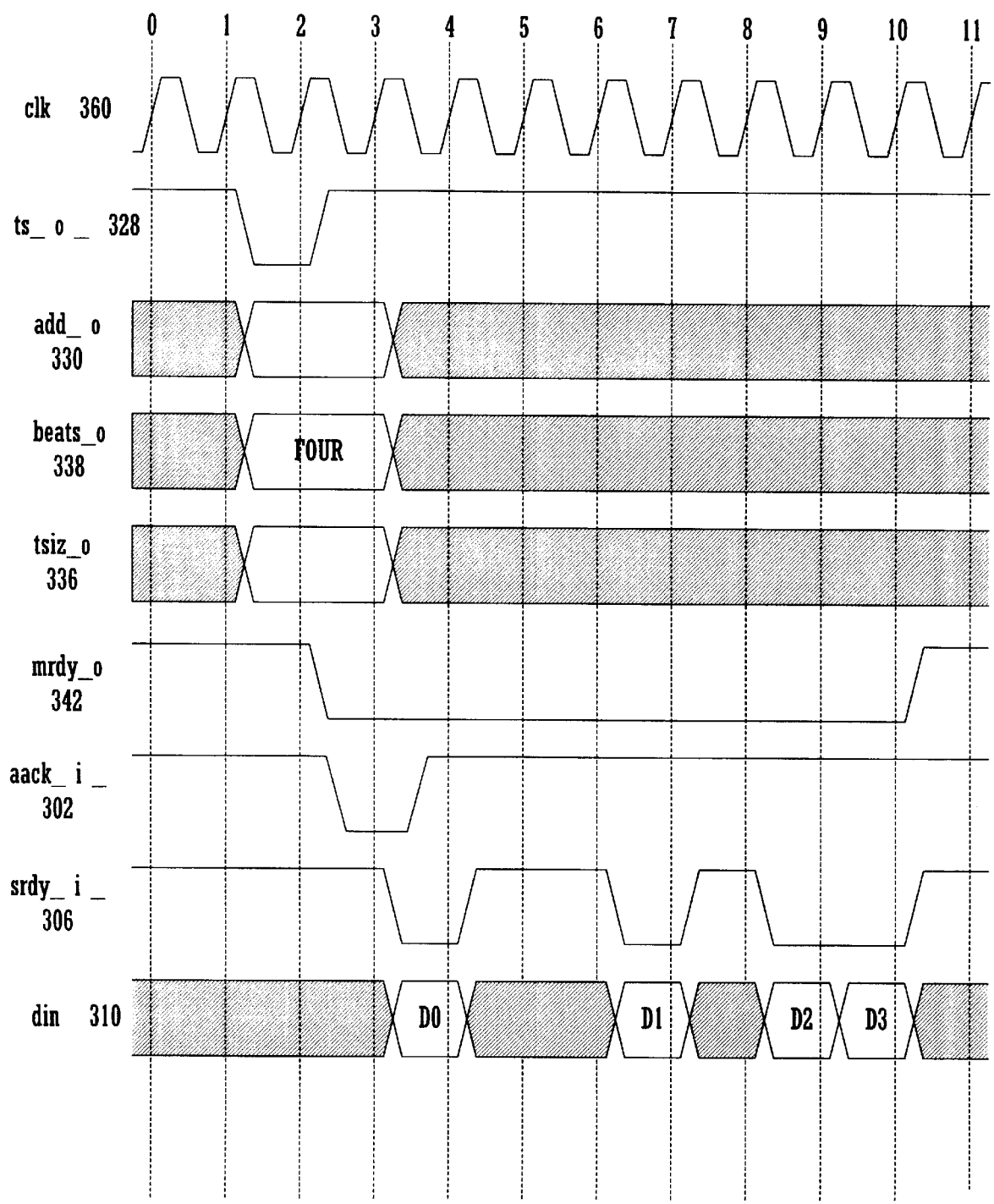
FIG. 19 is a timing diagram showing a read cycle with the slave inserting wait states.

FIG. 19 is a timing diagram showing the address and data phases of a read cycle with the slave inserting wait states. The master may not remove 'mrdy_o_' 342 once it has been asserted.

Figure 20:
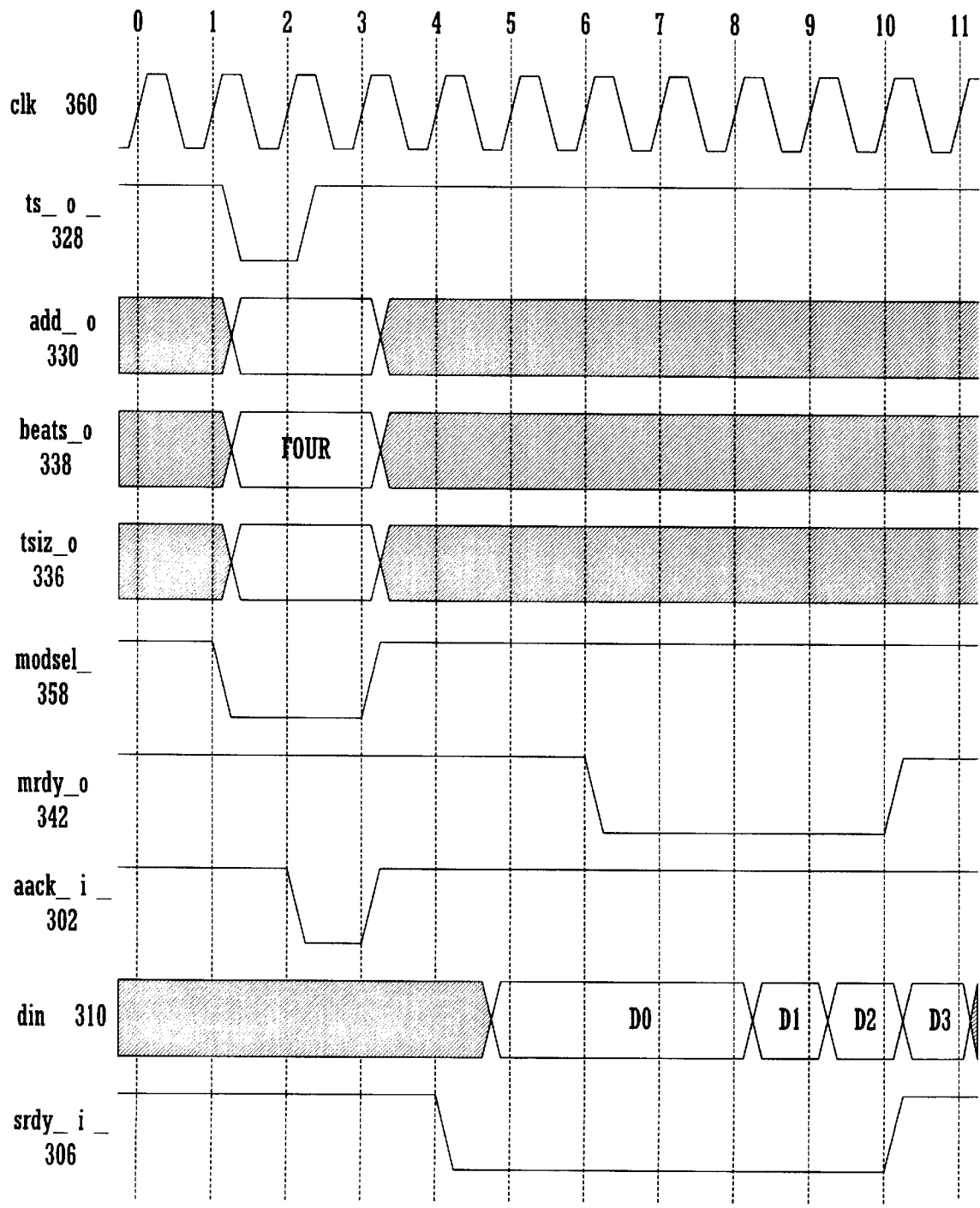
FIG. 20 is a timing diagram showing a read cycle with the master inserting wait states by delaying assertion of the 'master ready' signal.

FIG. 20 is a timing diagram showing the address and data phases of a read cycle with the master inserting wait states by delaying assertion of 'mrdy _o_' 342.

Bridge Module

Bridge module 214 of FIG. 2 is the circuitry which permits the architectural design to be adapted to any unique requirements while permitting the reuse of the other modules (e.g., 206–212). Bridge module 214 is responsible for acting as a bridge between CPU 202, memory 204, and all of the other modules (e.g., 206–212) which are connected to secondary bus 216. Furthermore, bridge module 214 is responsible for interfacing with the master and slave ports of each module. Moreover, bridge module 214 is responsible for generating snoop cycles on the CPU bus on behalf of all the modules. Additionally, bridge module 214 is responsible for acting as an arbiter and controls access to the address and data buses. The definition of bridge module 214, in accordance with the present invention, can be redesigned to match the different requirements of each application, while continuing to promote reusability of all the major modules. The design of bridge module 214 is also dependent on the interconnect scheme chosen to connect all the modules to secondary bus 216. The choice of the interconnect scheme is dependent on the traffic that the design is meant to handle.

Example Implementation

Figure 21:
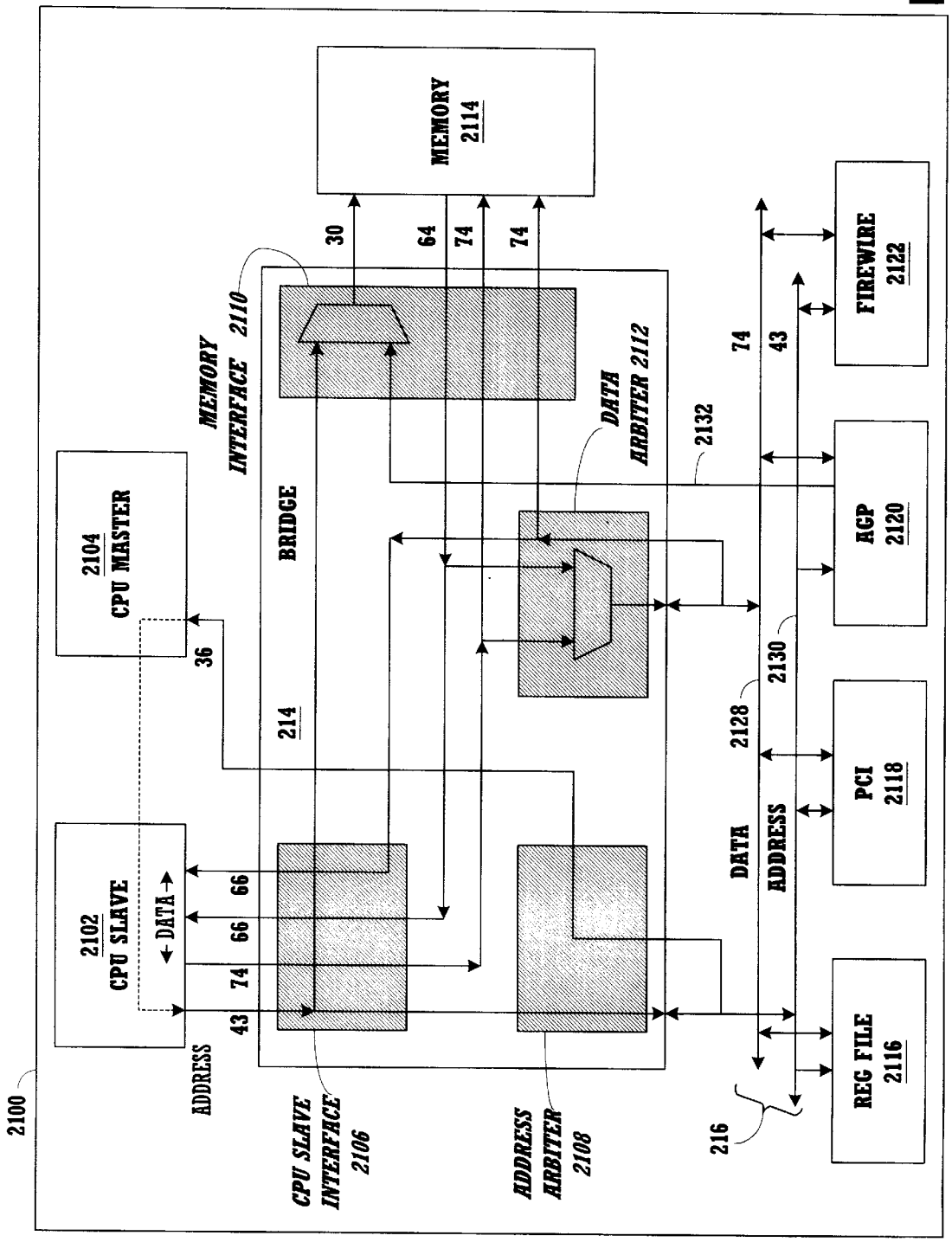
FIG. 21 is a block diagram of an embodiment of a North Bridge chip implementation using the design reuse scheme in accordance with the present invention.

FIG. 21 is a block diagram of an embodiment of a North Bridge chip implementation using the design reuse scheme in accordance with the present invention. The main modules located within North Bridge chip 2100 are a CPU slave module 2102, a CPU master module 2104, a bridge module 214, a memory interface module 2114, a register (reg.) file module 2116, a PCI module 2118, an accelerated graphics port (AGP) module 2120, and a Firewire module 2122. It should be appreciated that the name "Firewire" refers to a serial communication bus, which is also known by the reference number 1394 within the I.E.E.E. standard. Of the modules located within North Bridge chip 2100, register (reg.) file module 2116, PCI module 2118, AGP module 2120, and Firewire module 2122 are implemented on secondary bus 216, which is comprised of a data bus 2128 and an address bus 2130. Secondary bus 216 is controlled by bridge module 214. New functional modules can be added on secondary bus 216 by modifying bridge module 214. The CPU interface blocks (CPU master module 2104 and CPU slave module 2102) can be changed to target the design to a different CPU family.

Bridge module 214 of FIG. 21 is divided into four sub-modules which include a CPU slave interface 2106, a memory interface 2110, an address arbiter 2108, and a data arbiter 2112. The function of CPU slave interface 2106 is to interface the CPU (not shown) with memory module 2114 and secondary bus 216. Additionally, the function of memory interface 2110 is to interface the CPU and secondary bus 216 with memory module 2114. Moreover, the function of address arbiter 2108 is to control the address group on secondary bus 216. The function of data arbiter 2112 is to control the data group on secondary bus 216.

On secondary bus 216 of FIG. 21, the modules which can function as both master and slave devices are AGP module 2120, PCI module 2118, and Firewire module 2122. The module connected to secondary bus 216 which is defined as a slave only module is reg. file module 2116. Within one embodiment, in accordance with the present invention, the peak bandwidth demand on secondary bus 216 from AGP module 2120, PCI module 2118, and Firewire module 2122 to memory module 2114 is 528, 133, and 50 MB per second, respectively. Due to the nature of the CPU and the bus traffic requirements in this implementation, address bus 2130 and data bus 2128 of secondary bus 216 are shared by all the modules.

With reference to FIG. 21, it should be appreciated that a two digit number adjacently located to a line represents the number of lines utilized to implement that bus within North Bridge chip 2100. It should be further appreciated that a dedicated address line 2132, which connects AGP module 2120 and memory interface 2110, indicates that it is not necessary with the present invention for all the modules on secondary bus 3026 to share address bus 2130 or data bus 2128. For the present embodiment, AGP module 2120 is special because its cycles do not correlate to the cycles; of modules 2116, 2118, and 2122. Therefore, AGP module 2120 is connected to memory interface 2110 by dedicated address line 2132. Within another embodiment, in accordance with the present invention, dedicated address line 2132 does not exist and AGP module 2120 is connected to address bus 2130. In this manner, AGP module 2120 shares address bus 2130 with reg. file module 2116, PCI module 2118, and Firewire module 2122.

Figure 22:
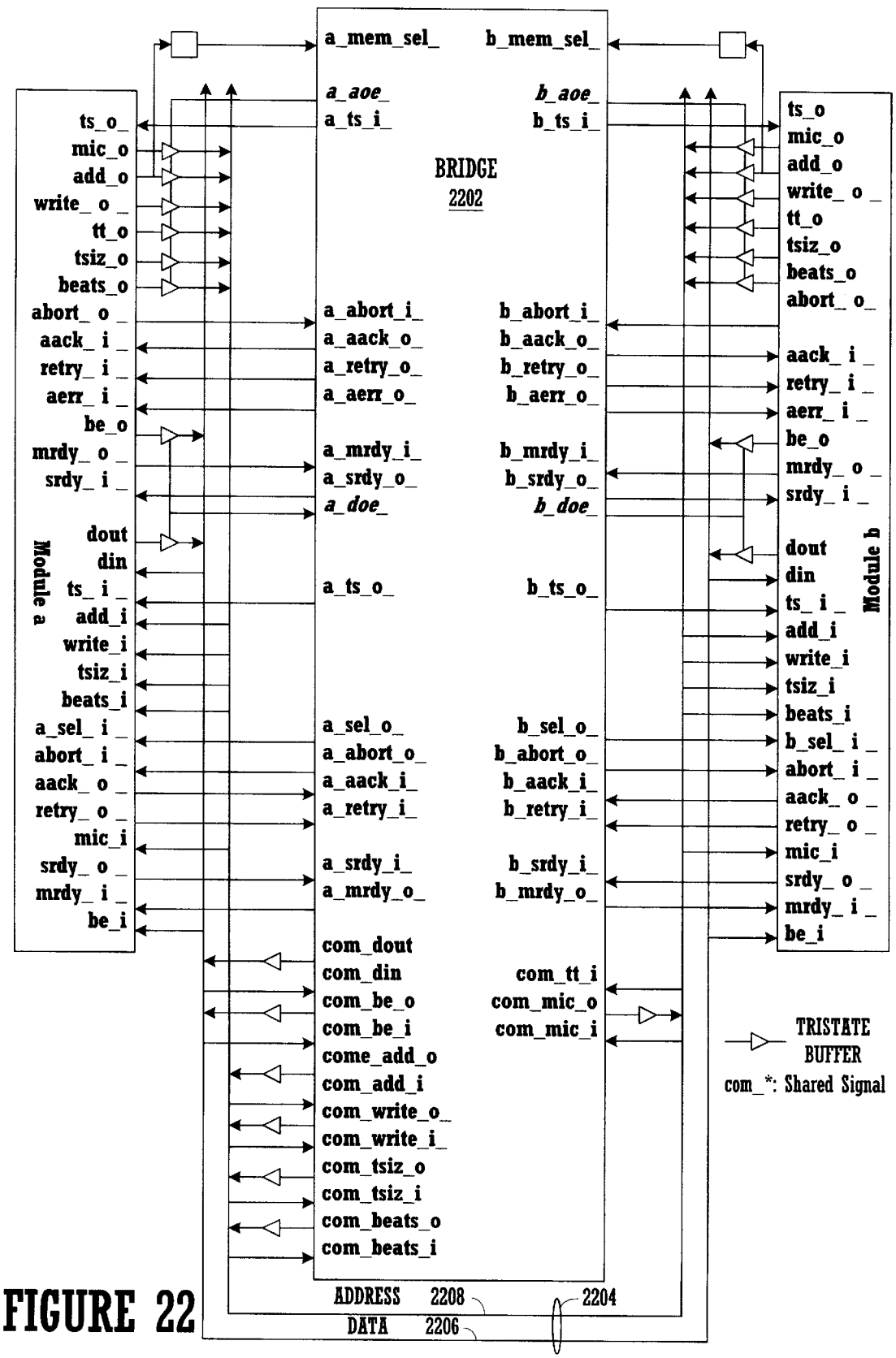
FIG. 22 is a block diagram of a bridge module interfacing between two modules "a" and "b" each having a respective master port and a respective slave port.

Using the shared address and data bus scheme, FIG. 22 is a block diagram of a bridge module 2202 interfacing between two modules "a" and "b". It is appreciated that all the control handshake signals between the modules and bridge module 2202 are implemented as point-to-point signals. This is accomplished by logic within bridge module 2202.

Figure 23:
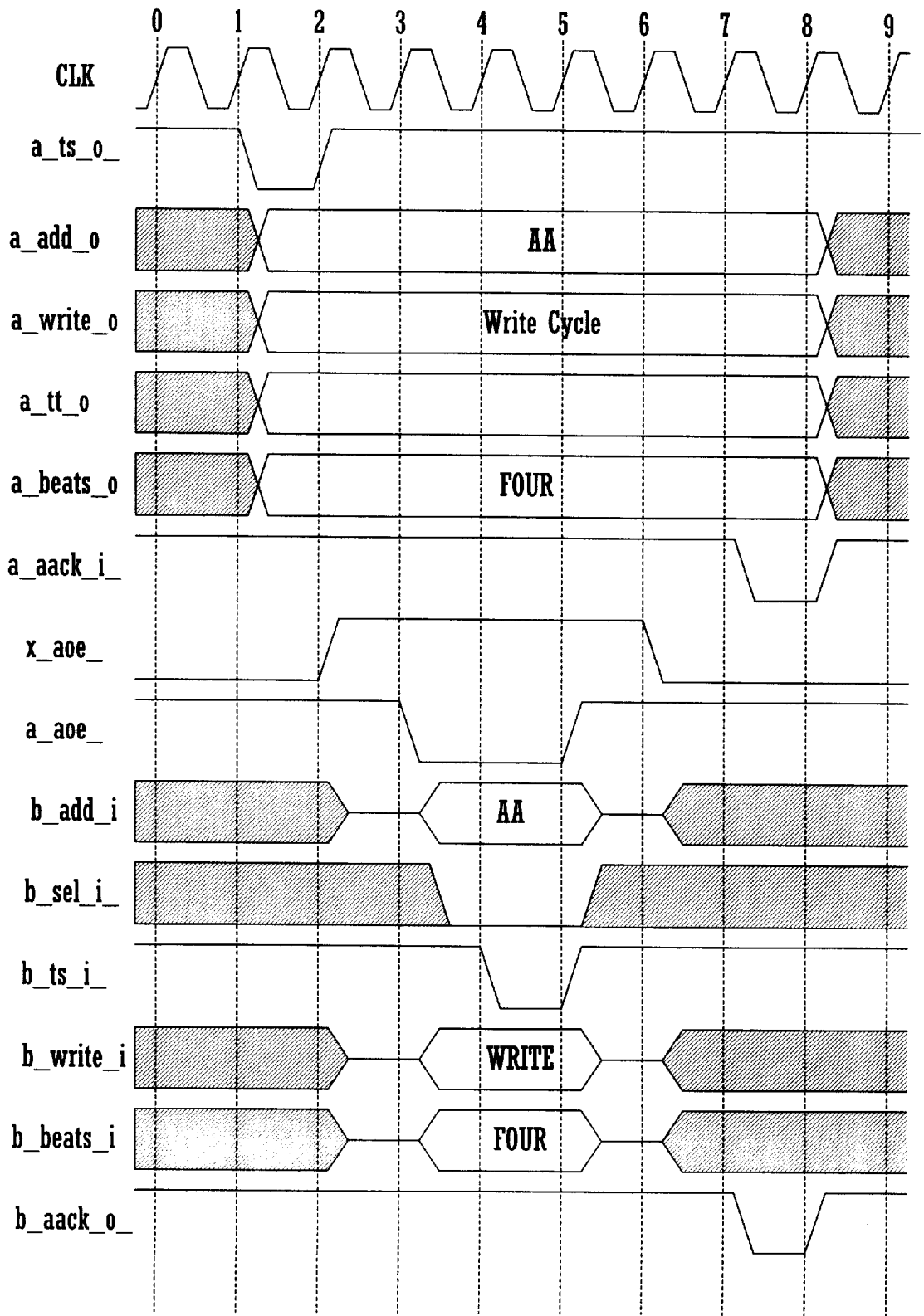
FIG. 23 is a timing diagram showing the manner in which bridge module of FIG. 22 controls the address cycles on the secondary bus.

FIG. 23 is a timing diagram showing how bridge module 2202 of FIG. 22 of controls the cycles on secondary bus 2204 for exemplary address phases. On clock 2 FIG. 23, module "a" issues a cycle on bus 2204. On detecting the cycle, bridge module 2202 unpacks address bus 2208 from module "x" (a prior user), and after a clock of turnaround then switches address bus 2208 to module "a". This causes the address driven by module "a" to be visible to all the modules. On clock 4, bridge module 2202 decodes that the cycle on bus 2204 is intended for module "b" and drives 'b_ts_i_' signal to it. Module "b" on detecting its signals 'b_ts_ i_' and 'b_sel_i_' active then latches the address and other address attributes on clock 5. On clock 8, module "b" acknowledges the cycle and this is passed on in the same clock by bridge module 2202 to module "a".

Figure 24:
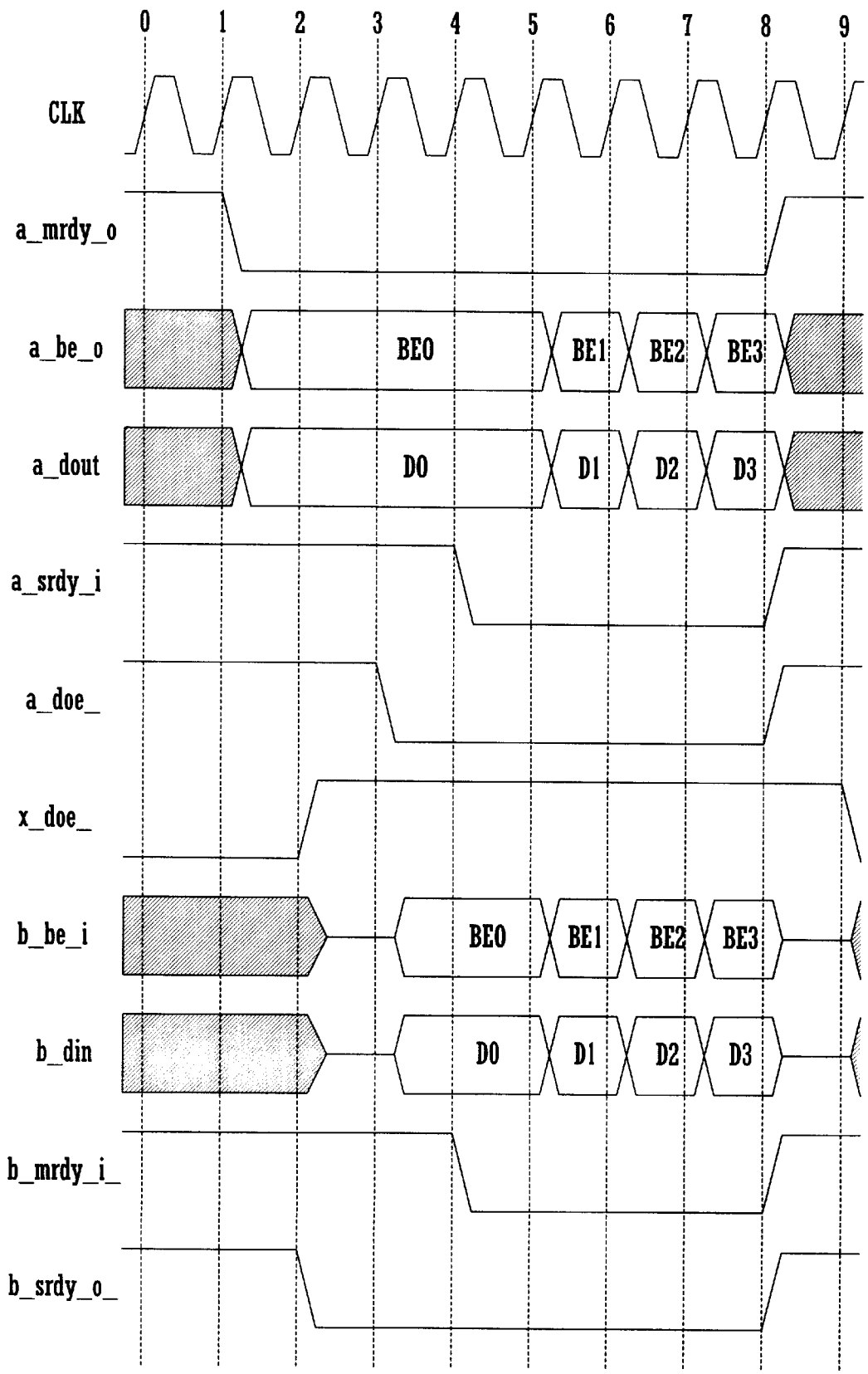
FIG. 24 is a timing diagram showing the data phase associated with the address cycle established in FIG. 23.

FIG. 24 is a timing diagram showing the data phase associated with the address cycle shown in FIG. 23. Bridge module 2202 of FIG. 22 detects assertion of 'a_mrdy_o_' by module "a" on clock 2. Bridge module 2202 unpacks data bus 2206 from module "x" and after one clock of turnaround, parks it on module "a". Module "b" asserts 'b_srdy_o_' on clock 3 to indicate its ability to accept the data. Bridge module 2202, having switched data bus 2206 to module "a" on clock 4, passes 'mrdy_' from module "a" to module "b" and passes 'srdy_' from "b" to module "a". This allows the data transfer to occur on clock signals 5–8.

Figure 25:
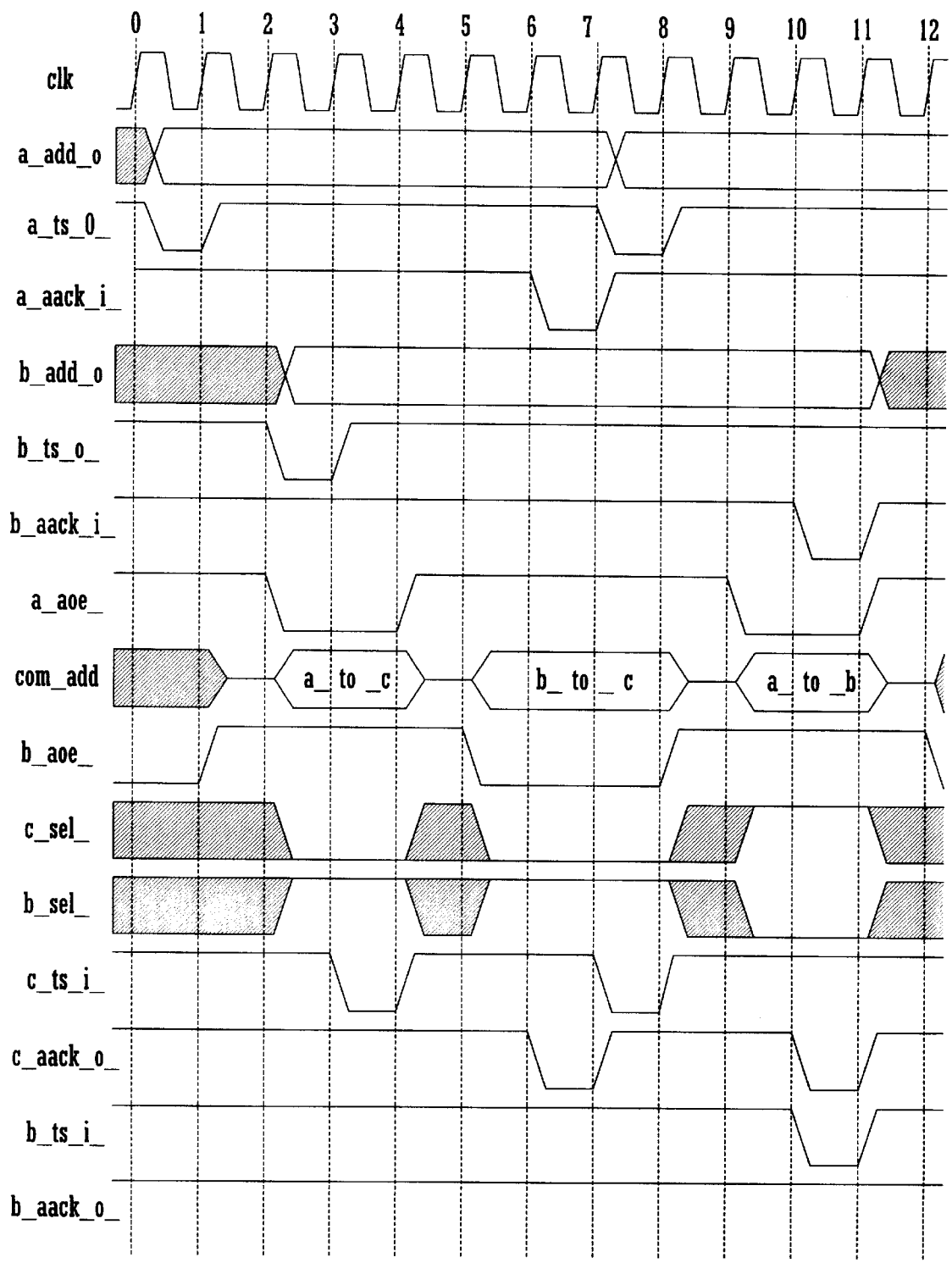
FIG. 25 is a timing diagram showing the bridge module of FIG. 22 controlling address cycles between three modules "a", "b", and "c".

FIG. 25 is a timing diagram showing bridge module 2202 of FIG. 22 controlling address cycles between three modules "a", "b", and "c". FIG. 25 illustrates that multiple address phases can be outstanding at any time in accordance with the present invention. On clock 0, module "a" issues 'a_ts_o_' signal and bridge module 2202, on detecting this on clock 1, parks address bus 2206 on module "a". On clock 3, bridge module 2202 decodes that the cycle module "a" issued is targeted towards module "c". Bridge module 2202 asserts 'c_ts_i_' to module "c" on clock 3 and parks bus 2204 on module "b" because it had issued a 'ts_' on clock 2. On clock 6, bridge module 2202 decodes that the cycle issued by module "b" is also targeted towards module "c". Bridge module 2202 does not forward this cycle to module "c" because it has yet to acknowledge the previous address issued to it. On clock 6, "c" assorts a 'c_aack_o_' signal for the previous address phase. This 'c_aack_o_' signal is passed by bridge module 2202 to module "a". Bridge module 2202 issues a 'ts_' to module "c" on clock 7 for the cycle issued by module "b". Module "a" on receiving an 'a_aack_i_' signal on clock 7 issues another 'a_ts_ '. Bridge module 2202 decodes that the cycle is targeted towards module "b" and issues a 'b_ts_i_' signal to it on clock 10. Module "c" issues a 'c_aack_o_' signal to acknowledge the cycle issued to it by module "b" on clock 10, and this is passed back to module "b" in the same clock.

It should be appreciated that multiple address phases can be simultaneously outstanding over an embodiment of a secondary bus, in accordance with the present invention, as illustrated by FIG. 25. This is accomplished by having the definition of the signals for all slaves such that each slave is to latch an address on the clock signal that it detects a valid cycle. In this manner, the secondary bus can be optimally utilized.

Module Selects

Figure 26:
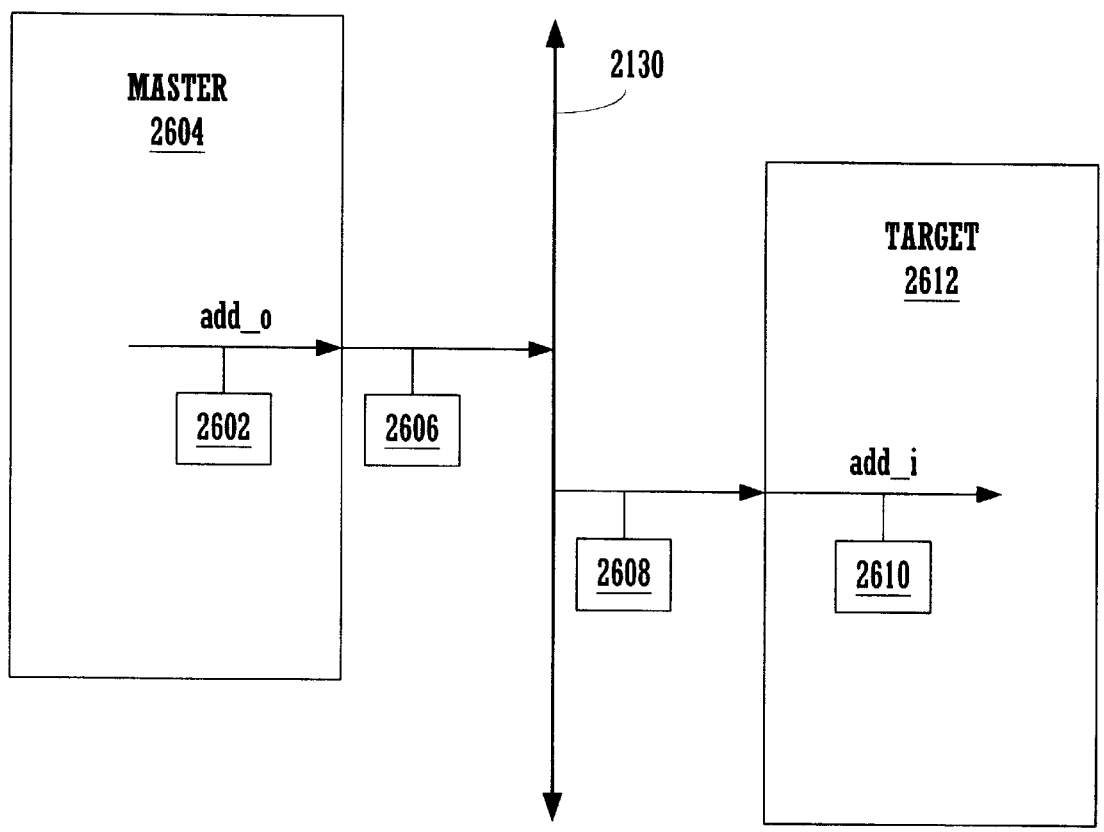
FIG. 26 is a block diagram showing several different address decoding schemes, in accordance with the present invention, that can be used to generate the module select signals on an address bus of the secondary bus.

Cycles on secondary bus 216 of FIG. 21 can be classified into two categories based on their source, (1) generated by bridge module 214 (CPU) or (2) generated by the modules. FIG. 26 is a block diagram showing several different address decoding mechanisms, in accordance with the present invention, that can be used to generate the module select signals on address bus 2130 of secondary bus 216. One mechanism is to have an address decoder 2602 that is internal to a master 2604, as shown in FIG. 26. The advantage of this mechanism is that it is fast as select is available before address bus 2130 is switched to master 2604. The disadvantage of this mechanism is that it reduces reusability as master 2604 has to be aware of targets and the address map of the particular implementation. Another mechanism is to have an address decoder 2606 which is external to master 2604, but it is not shared. The advantage of this mechanism is that it is fast as select is available before address bus 2130 is switched to master 2604. The disadvantage of this mechanism is that it duplicates decoder logic for each module.

Another address decoding mechanism, in accordance with the present invention, is to have an address decoder 2608 of FIG. 26 located on shared address bus 2130. The advantages of this mechanism is that it centralizes the decode logic and can handle address alias, hole, and error conditions. The disadvantage of this mechanism is that it is slow as select is not available until address bus 2130 is switched to master 2604. Another mechanism is to have an address decoder 2610 that is internal to a target 2612. The advantage of this mechanism is that it requires no external logic. The disadvantages of this mechanism is that it is poor at address alias and hole handling. Furthermore, this mechanism limits the ability to handle multiple address phases simultaneously. Moreover, this mechanism requires a shared common address bus.

Bridge module 214 of FIG. 21 uses a combination of the address decoder mechanisms described above, with reference to FIG. 26, to generate the select signals in accordance with the present invention. One type of access scheme of the present embodiment is from bridge module 214 (CPU) to the modules. Since the CPU address passes through bridge module 214 before it is driven on the bus, bridge module 214 uses an address decoder 2602 that is internal to a master to generate the select signals to the modules for these cycles. Another type of access scheme is from the modules to the memory. These cycles require bridge module 214 to generate a snoop cycle on the CPU address bus. The early availability of the select signal permits the snoop arbitration to start before the address is driven on the bus. Since the generation of this select signal is not logic intensive (e.g., memory space $\geq 1$ GB3), bridge module 214 uses an address decoder 2606 external to a master, which is not shared, to decode these cycles. Another type of access scheme is from module to module. Since the target module cannot distinguish between cycles issued to it by another module and cycles issued to it by bridge module 214 (CPU), bridge module 214 can either use an address decoder 2608 located on a shared address bus or use an address decoder 2610 that is internal to a target to generate the select signals for these cycles.

Performance

Rate of Address

Figure 27:
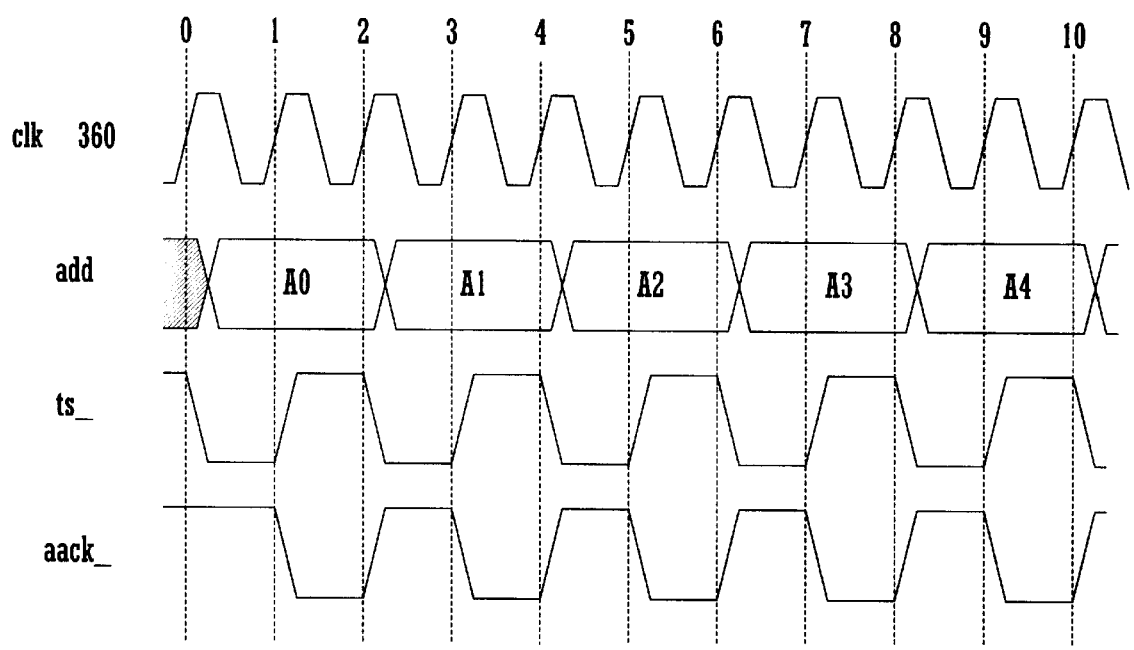
FIG. 27 is a timing diagram showing a module parked on the bus, and the fastest rate of issuing addresses.

On secondary bus 216 of FIG. 21, the fastest a module can acknowledge a cycle is within one clock of receiving a 'ts_' signal. FIG. 27 is a timing diagram showing a module parked on the bus, and the fastest rate of issuing addresses. It should be appreciated that the fastest rate of issuing cycles by any module at 100 MHz is 50 M/second in one implementation of the present invention. Furthermore, the maximum data transfer rate of the same agent driving the bus at 100 MHz is: 8 Bytes×100 MHz=800 MB/sec using this exemplary implementation. Moreover, the maximum data transfer rate with different agents doing back to back cycles at 100 MHz for a cache line size of 32 bytes is: ⅘×800=640 MB/sec. Additionally, the maximum data transfer rate with different agents doing back to back cycles at 100 MHz for a cache line size of 64 bytes is: 8/9×800=711 MB/sec.

PRIMARY BUS

Figure 28:
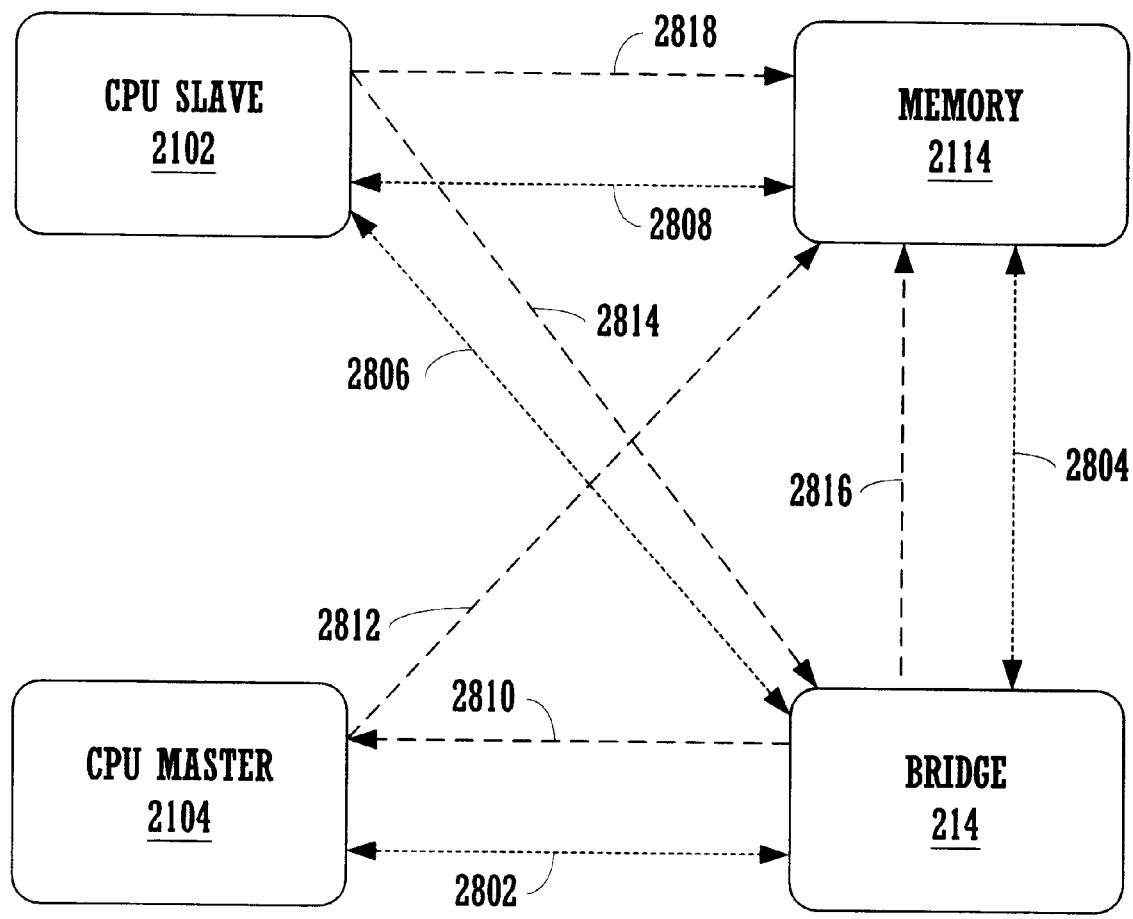
FIG. 28 is a block diagram showing the communication traffic which is possible between the various modules over the primary bus of the present invention.
Figure 29:
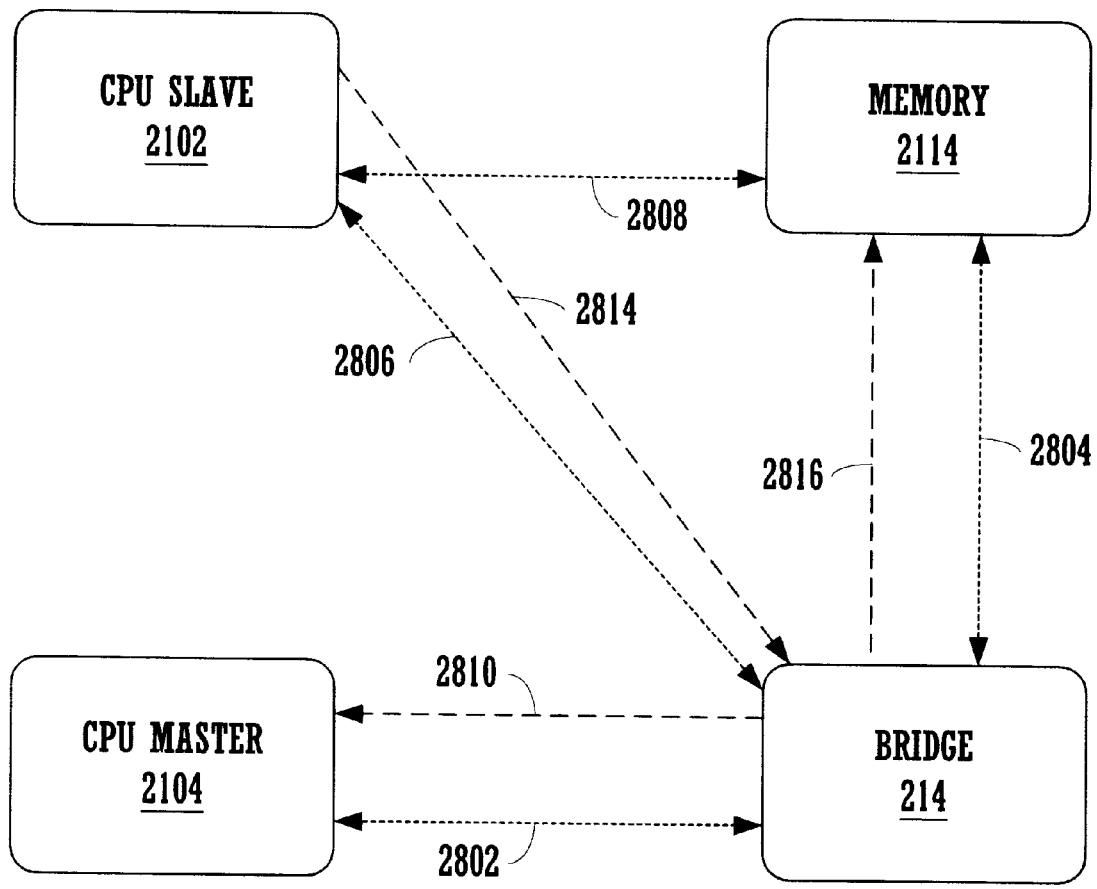
FIG. 29 is a block diagram showing the interconnect scheme of the primary bus of the present invention.

Referring to FIG. 28, the modules connected to one embodiment of a primary bus in accordance with the present invention, are a CPU slave module 2102, a CPU master module 2104, a memory module 2114, and a bridge module 214. FIG. 28 is a block diagram showing the communication traffic which is possible between the various modules over the primary bus. It should be appreciated that arrows 2802–2808 represent data transfers between the modules, while arrows 2810–2818 represent address transfers between the modules. Bridge module 214 forwards the cycles from the modules on secondary bus 216, of FIG. 21, to memory module 2114 directly (if no snooping is required) or through CPU master interface 2104 (after the snoop is complete). Memory module 2114 can get addresses from three modules and data from two modules. Instead of sending the address directly to memory module 2114, it can be routed through bridge module 214. This way memory module 2114 has a single port for address and two ports for data. FIG. 29 is a block diagram showing another interconnect scheme of the primary bus. The bus protocol used to communicate between the modules of the primary bus can be the same as the secondary bus to start with, and later can be adapted as the bandwidth requirement changes.

Figure 30:
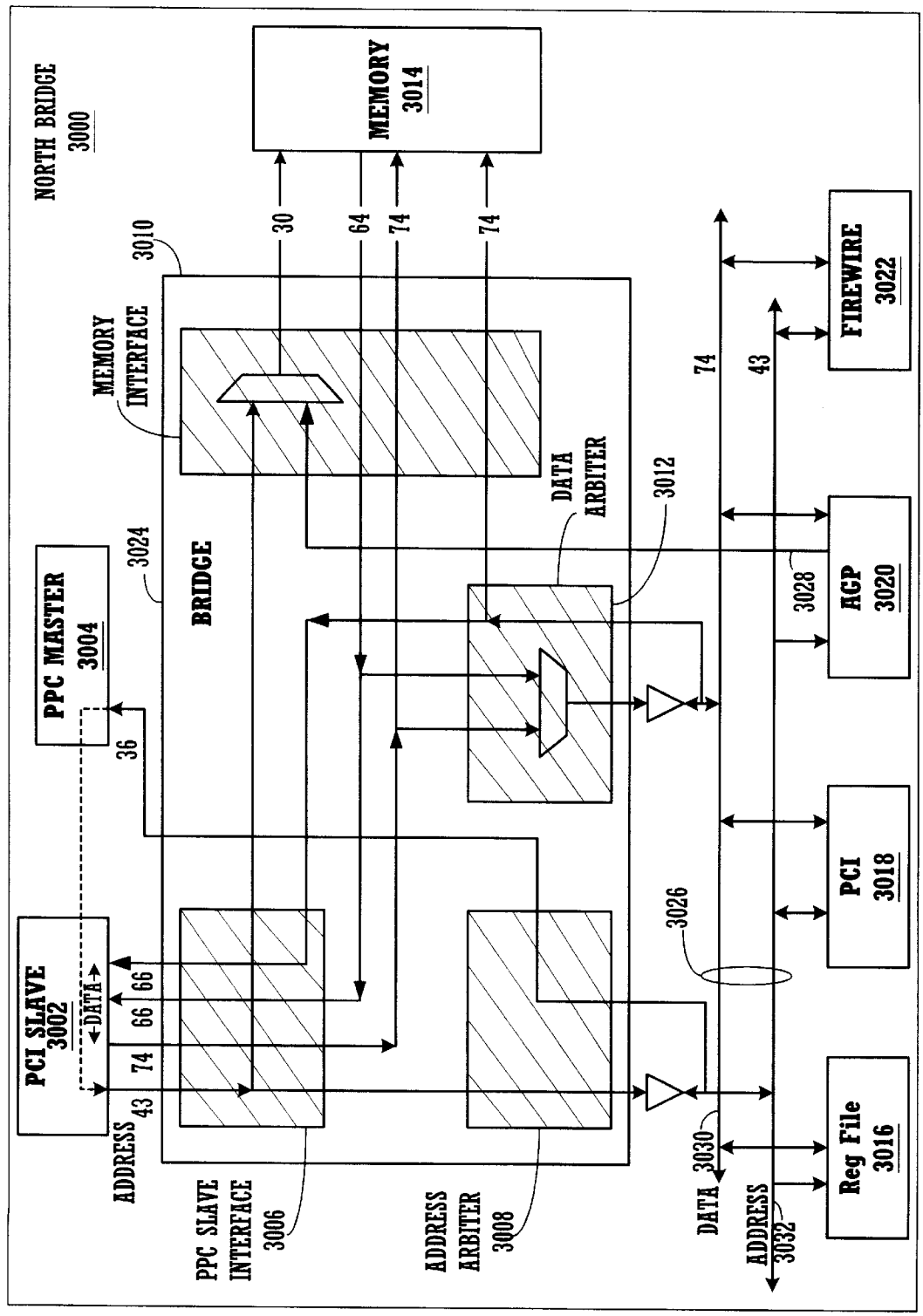
FIG. 30 is a block diagram of an Apple® PowerPC (PPC) chip set implemented using a North Bridge chip embodiment in accordance with the present invention.

FIG. 30 is a block diagram of an Apples® PowerPC (PPC) chip set implemented using a North Bridge chip embodiment in accordance with an embodiment of the present invention. The main modules located within North Bridge chip 3000 are a PPC slave module 3002, a PPC master module 3004, a bridge module 3024, a memory module 3014, a reg. file module 3016, a PCI module 3018, an AGP module 3020, and a Firewire module 3022. Of these modules, PCI module 3018, reg. file module 3016, AGP module 3020, and Firewire module 3022 are connected through tri-stateable address and data lines using the secondary bus definition, previously described. All the connections between PPC slave module 3002, PPC master module 3004, memory module 3014, and bridge module 3024 are implemented as point-to-point signals.

It should be appreciated that bridge module 3024 of FIG. 30 is further divided into four sub-modules which includes a PPC slave interface 3006, a memory interface 3010, an address arbiter 3008, and a data arbiter 3012. These sub-modules of bridge module 3024 function in the same manner as sub-modules 2106–2112 of FIG. 21 function, described above.

With reference to FIG. 30, it should be appreciated that a two digit number adjacently located to a line represents the number of lines utilized to implement that bus within North Bridge chip 3000. It should be further appreciated that a dedicated address line 3028, which connects AGP module 3020 and memory interface 3010, indicates that it is not necessary with the present invention for all the modules on secondary bus 3026 to share address bus 3032 or data bus 3030. For the present embodiment, AGP module 3020 is special because its cycles do not correlate to the cycles of modules 3016, 3018, and 3022. Therefore, AGP module 3020 is connected to memory interface 3010 by dedicated address line 3028. Within another embodiment, in accordance with the present invention, dedicated address line 3028 does not exist and AGP module 3020 is connected to address bus 3032. In this manner, AGP module 3020 shares address bus 3032 with reg. file module 3016, PCI module 3018, and Firewire module 3022.

Coherence Requirement

Figure 31:
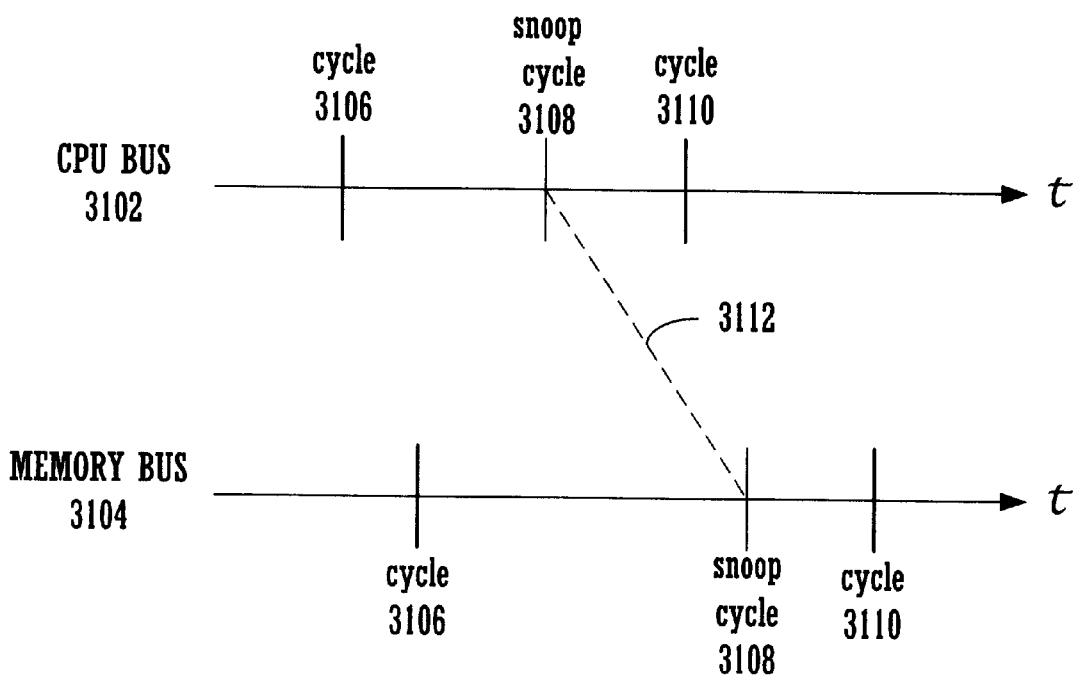
FIG. 31 is a diagram of a CPU bus and a memory bus used to illustrate a snoop cycle.

Transactions from secondary bus 3026 of FIG. 30 may have to be snooped on the CPU bus before being serviced by the memory. In FIG. 31, cycles 3106 and 3110 appearing on CPU bus 3102 are requests from the CPU to memory, while cycle 3108 is a snoop cycle. C)n memory bus 3104, cycle 3106 should always complete before snoop cycle 3108, as failure to do so can lead to deadlocks. If the address of cycle 3110 is in the same cache line as that of snoop cycle 3108 already on memory bus 3104, snoop cycle 3108 should always complete earlier than cycle 3110. In another implementation of the above two requirements, line 3112 cannot be crossed and links snoop cycle 3108 on CPU bus 3102 and the appearance of snoop cycle 3108 on memory bus 3104. No CPU cycle (e.g., cycles 3106 or 3110) should be able to cross over this imaginary line 3112. Thus, all cycles appearing on CPU bus 3102 before the occurrence of snoop cycle 3108 appear on memory bus 3104 before snoop cycle 3108 appears on memory bus 3104. Furthermore, all cycles appearing on CPU bus 3102 after snoop cycle 3108 appear on memory bus 3104 after snoop cycle 3108 appears on memory bus 3104.

Figure 32A:
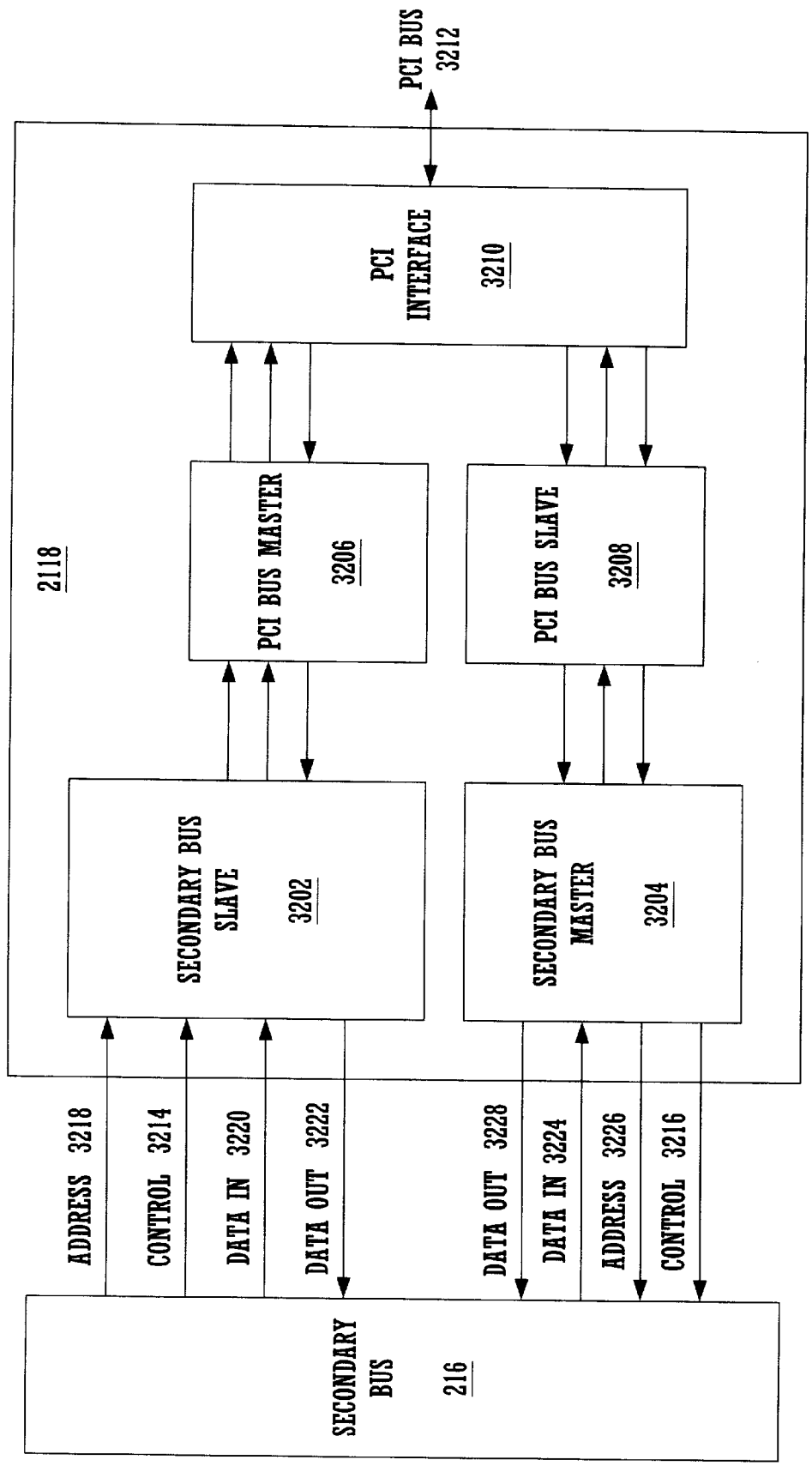
FIG. 32A is a block diagram of one embodiment of the internal components of the PCI module of FIG. 21, in accordance with the present invention.

FIG. 32A is a block diagram of one embodiment of the internal components of PCI module 2118 of FIG. 21, in accordance with the present invention. The PCI module 2118 contains five subsections of specific circuitry which includes a secondary bus slave 3202, a secondary bus master 3204, a PCI bus master 3206, a PCI bus slave 3208, and a PCI interface 3210 which is connected to a PCI bus 3212. It should be appreciated that the control signal 3214 input into secondary bus slave 3202 represents all the control signals input into a slave as described in the secondary bus definition above. It should further be appreciated that the control signal 3216 output from secondary bus master 3204 represents all the control signals output by a master as described in the secondary bus definition above.

Figure 32B:
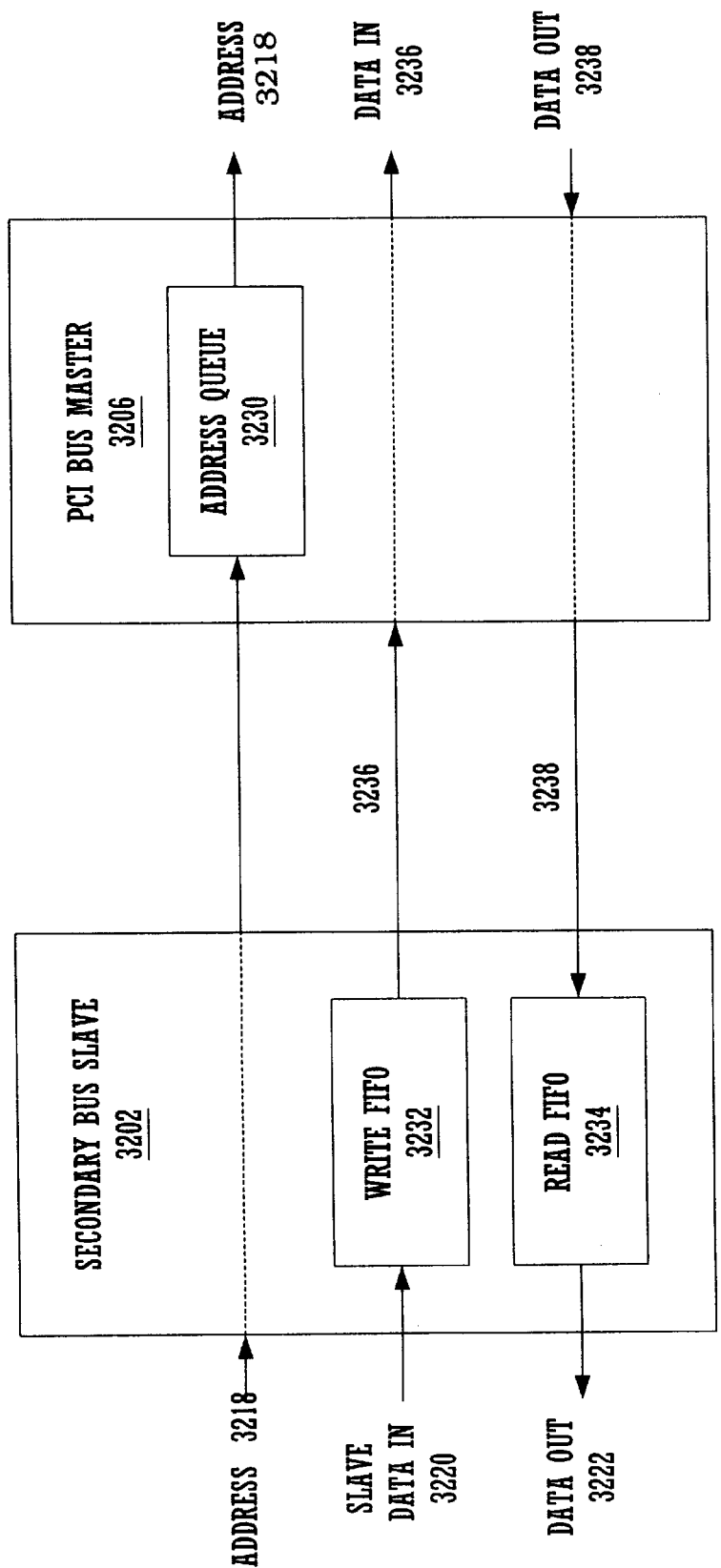
FIG. 32B is a block diagram of the secondary bus slave and the PCI bus master, which are both located within the PCI module of FIG. 32A.

With reference to FIG. 32B, since the definition of secondary bus 216 of FIGS. 32A remains constant within the present embodiment, the circuitry of secondary bus slave 3202 and secondary bus master 3204 are duplicated within the other modules (e.g., AGP module 2120 and Firewire module 2122) connected to secondary bus 216. In this manner, the other modules are able to communicate over secondary bus 216. It should be appreciated that secondary bus master 3204 is a master port unit, while secondary bus slave 3202 is a slave port unit.

FIG. 32B is a block diagram of secondary bus slave 3202 and PCI bus master 3206, which are both located within PCI module 2118 of FIG. 32A. Secondary bus slave 3202 of FIG. 32B receives cycles on secondary bus 216 and forwards them to PCI bus master 3206. Moreover, PCI bus master 3206 receives cycles from secondary bus slave 3202 and forwards them to PCI interface 3210 of FIG. 32A. Within the present embodiment, it should be appreciated that secondary bus slave 3202 shares a 64 bit input bus and a 64 bit output bus with secondary bus master 3204 of FIG. 32A in order to move data into and out of PCI module 2118 with minimal wait states. It should be further appreciated that the present embodiment of secondary bus slave 3202 is able to support address pipelining. Furthermore, the present embodiment of PCI bus master 3206 is able to generate cycles for memory, input/output, configuration, interrupt acknowledge, and special cycles. Additionally, PCI bus master 3206 is able to support read pre-fetching where the address range is programmable, write word combining within the PCI memory range, and write byte merging where the address range is programmable.

With reference to FIG. 32B, secondary bus slave 3202 accepts cycles from secondary bus 216 and forwards them to PCI bus master 3206. For example, secondary bus slave 3202 receives an address signal 3218 from secondary bus 216 and forwards it to an address queue 3230, located within PCI bus master 3206. Subsequently, address queue 3230 outputs address signal 3218 to PCI interface 3210 of FIG. 32A. Within the present embodiment, address signal 3218 contains 32 bits of data while address queue 3230 is able to store up to two address entries.

Secondary bus slave 3202 of FIG. 32B additionally receives slave data input signal 3220 from secondary bus 216, which is input into a write first-in first-out (FIFO) device 3232. Subsequently, write FIFO device 3232 outputs data signal 3236 to PCI bus master 3206, which forwards it to PCI interface 3210 of FIG. 32A. Within one embodiment, slave data input signal 3220 contains 64 bits of data, while data signal 3236 output from write FIFO device 3232 only contains 32 bits of data. Moreover, write FIFO device 3232 has storage dimensions of 36×8 in one implementation.

PCI bus master 3206 of FIG. 32B receives data output signal 3238 from PCI interface 3210 of FIG. 32A and forwards it to a read FIFO device 3234, located within secondary bus slave 3202. Subsequently, read FIFO device 3234 outputs data output signal 3222 to secondary bus 216 of FIG. 32A. Within the present embodiment, data output signal 3238 contains 32 bits of data, while a data signal 3222 output by read FIFO 3234 contains 64 bits of data. Furthermore, one embodiment of read FIFO 3234 has storage dimensions of 32×8.

Figure 32C:
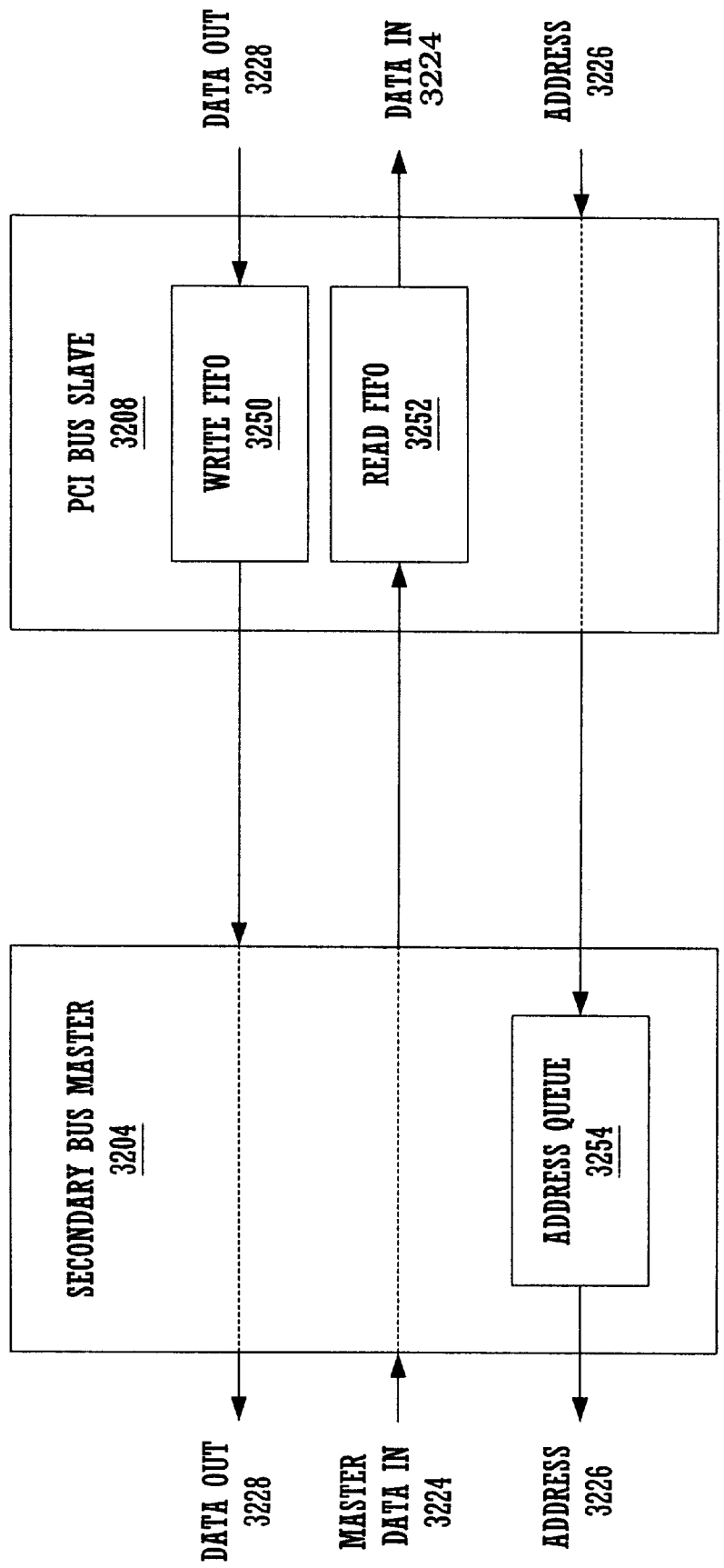
FIG. 32C is a block diagram of the secondary bus master and the PCI bus slave, which are both located within the PCI module of FIG. 32A.

FIG. 32C is a block diagram of secondary bus master 3204 and PCI bus slave 3208, which are both located within PCI module 2118 of FIG. 32A. PCI bus slave 3208 of FIG. 32C receives cycles from PCI interface 3210 and forwards them to secondary bus master 3204. Moreover, secondary bus master 3204 receives cycles from PCI bus slave 3208 and forwards them to secondary bus 216 of FIG. 32A. Within the present embodiment, it should be appreciated that PCI bus slave 3208 supports write data posting. It should be further appreciated that the present embodiment of secondary bus master 3204 is able to support address pipelining and also provides support for write to invalidate. Furthermore, it should be appreciated that secondary bus master 3204 shares a 64 bit input bus and a 64 bit output bus with secondary bus slave 3202 of FIG. 32B in order to move data into and out of PCI module 2118 of FIG. 32A with minimal wait states.

With reference to FIG. 32C, PCI bus slave 3208 accepts cycles from PCI interface 3210 of FIG. 32A and forwards them to secondary bus master 3204. For example, PCI bus slave 3208 receives an address signal 3226 from PCI interface 3210 and forwards it to an address queue 3254, located within secondary bus master 3204. Subsequently, address queue 3254 outputs address signal 3226 to secondary bus 216 of FIG. 32A. Within the present embodiment, address signal 3256 contains 32 bits of data while address queue 3254 is able to store up to four address entries.

PCI bus slave 3208 of FIG. 32C additionally receives output data signal 3228 from PCI interface 3210 of FIG. 32A, which is input into a write FIFO device 3250. Subsequently, write FIFO device 3250 outputs data signal 3228 to secondary bus master 3204, which forwards it to secondary bus 216 of FIG. 32A. Within one embodiment, output data signal 3228 contains 64 bits of data and write FIFO device 3250 has storage dimensions of 64×8.

Secondary bus master 3204 of FIG. 32C receives master data input signal 3224 from secondary bus 216 of FIG. 32A and forwards it to a read FIFO device 3252, located within PCI bus slave 3208. Subsequently, data input 3224 is output by read FIFO device 3252 to PCI interface 3210 of FIG. 32A. Within one embodiment, data input signal 3224 contains 64 bits of data, while read FIFO device 3252 has storage dimensions of 64×8.

Bus Interface

Figure 33:
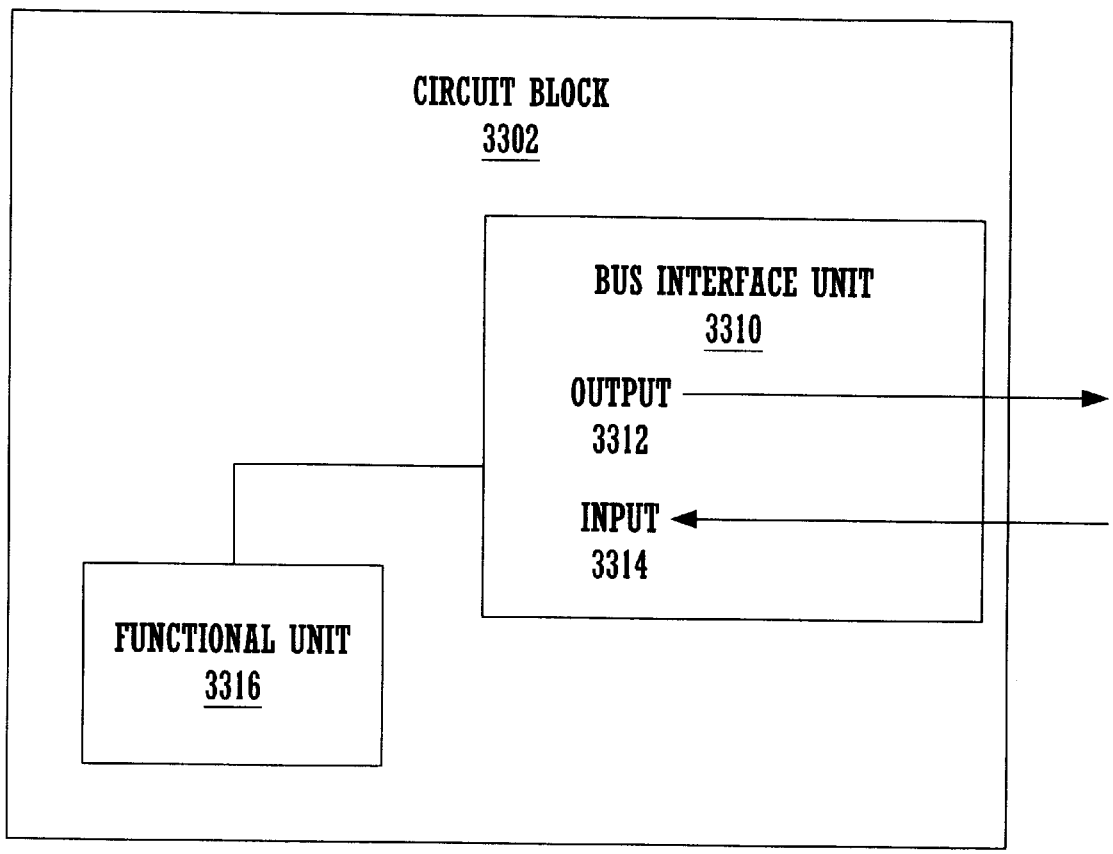
FIG. 33 is a block diagram of a bus interface unit, in accordance with the present invention, located within a circuit block.

The present invention includes a bus interface method for connecting modules (e.g., circuit blocks) in different types of interconnection schemes while the circuit block remain unchanged. An embodiment of this bus interface method, in accordance with the present invention, is used by bridge module 214 of FIG. 21 to interface with modules 2116–2122 which are connected and share secondary bus 216. In the present embodiment, the bus interface unit of each module is implemented with the assumption that all their signals are point-to-point signals. As such, the bus interface unit does not implement any shared signals, but instead all the signals are either input or output signals. FIG. 33 is a block diagram of a bus interface unit 3310, in accordance with the present invention, located within a circuit block 3302 along with a functional unit 3316. It should be appreciated that circuit block 3302 can also be referred to as module 3302. Notice that bus interface unit 3310 does not implement any shared signals, but only has an input 3314 and an output 3312. By designing bus interface units of circuit blocks in accordance with the present invention, it enables the circuit blocks to be interconnected in a wide variety of ways without having to redesign or change any of their internal circuitry. Instead, the sharing of the signals are controlled by an external control block, if needed. As such, in accordance with the present invention the interconnection scheme of the circuit blocks can be changed to fit desired performance levels or expected traffic levels, while the circuit blocks remain unchanged. Consequently, little or no time is spend redesigning existing circuit blocks when bus modification are implemented within future computer systems which still utilize the existing circuit blocks.

Figure 34:
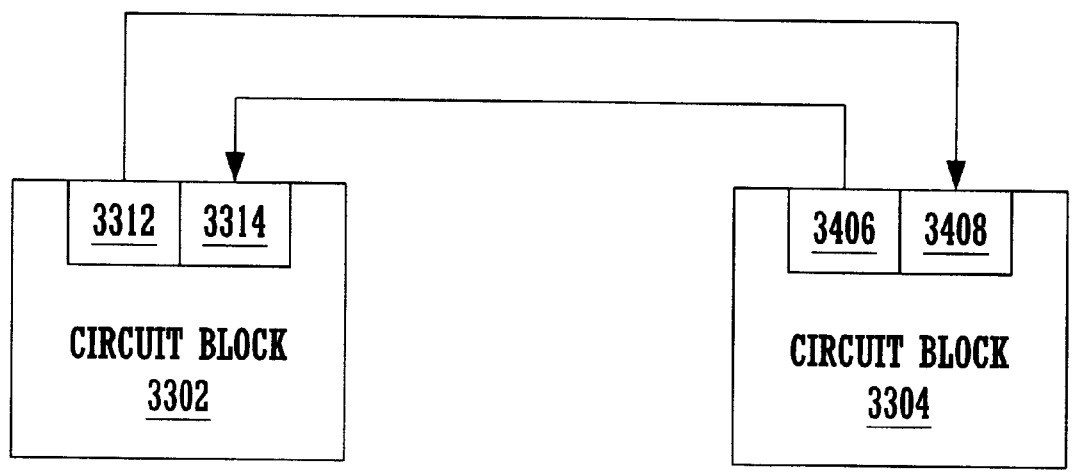
FIG. 34 is a block diagram of one interconnection scheme in accordance with the present invention.

FIG. 34 is a block diagram of an interconnection scheme 3400, which is one of the simplest interconnection schemes in accordance with the present invention. Interconnection scheme 3400 shows circuit block 3302 connected directly to circuit block 3304, which is a point-to-point connection. Specifically, output 3312 of circuit block 3302 is connected to input 3408 of circuit block 3304. Furthermore, output 3406 of circuit block 3304 is connected to input 3314 of circuit block 3302. Interconnection scheme 3400 illustrates one embodiment in which circuit blocks 3302 and 3304 can be interconnected without having to change any of their internal circuitry.

Figure 35:
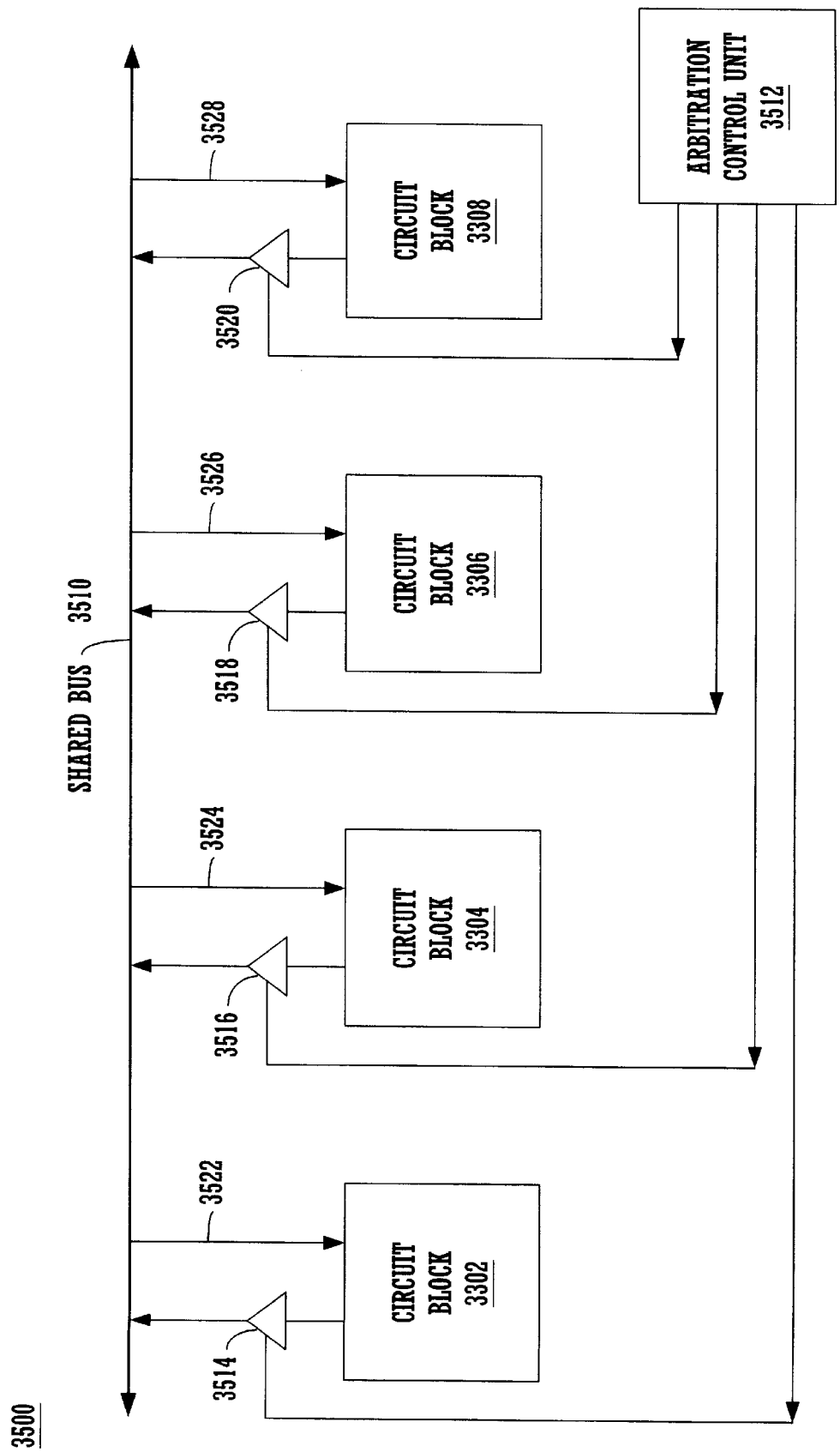
FIG. 35 is a block diagram of an interconnection scheme, where the sharing of the signals over an external off-chip bus is controlled by an external arbitration control unit, in accordance with the present invention.

FIG. 35 is a block diagram of an interconnection scheme 3500, where the sharing of the signals over an external off-chip bus 3510 is controlled by an external arbitration control unit 3512, in accordance with the present invention. Interconnection scheme 3500 illustrates an embodiment in which circuit blocks 3302–3308 can be interconnected without having to change any of their internal circuitry. Specifically, arbitration control unit 3512 is connected to tri-state buffers 3514–3520, which are external bus control circuits, in order to turn on and off the output lines of circuit blocks 3302–3208. It should be appreciated that if shared bus 3510 was a shared address bus, arbitration control unit 3512 would function as an address arbiter (e.g., address arbiter 2108 of FIG. 21). Furthermore, if shared bus 3510 was a shared data bus, arbitration control unit 3512 would function as a data arbiter (e.g., data arbiter 2112 of FIG. 21). It should be appreciated that input lines 3522–3528, which connect circuit blocks 3302–3308 to shared bus 3510, respectively, are always enabled. Therefore, circuit blocks 3302–3308 all read the input data, they ignore the data that is not for them. Within one embodiment of interconnection scheme 3500, a circuit block knows a cycle is intended for it when it receives a separate control signal indicating that the data it is seeing on shared bus 3510 is valid.

Figure 36:
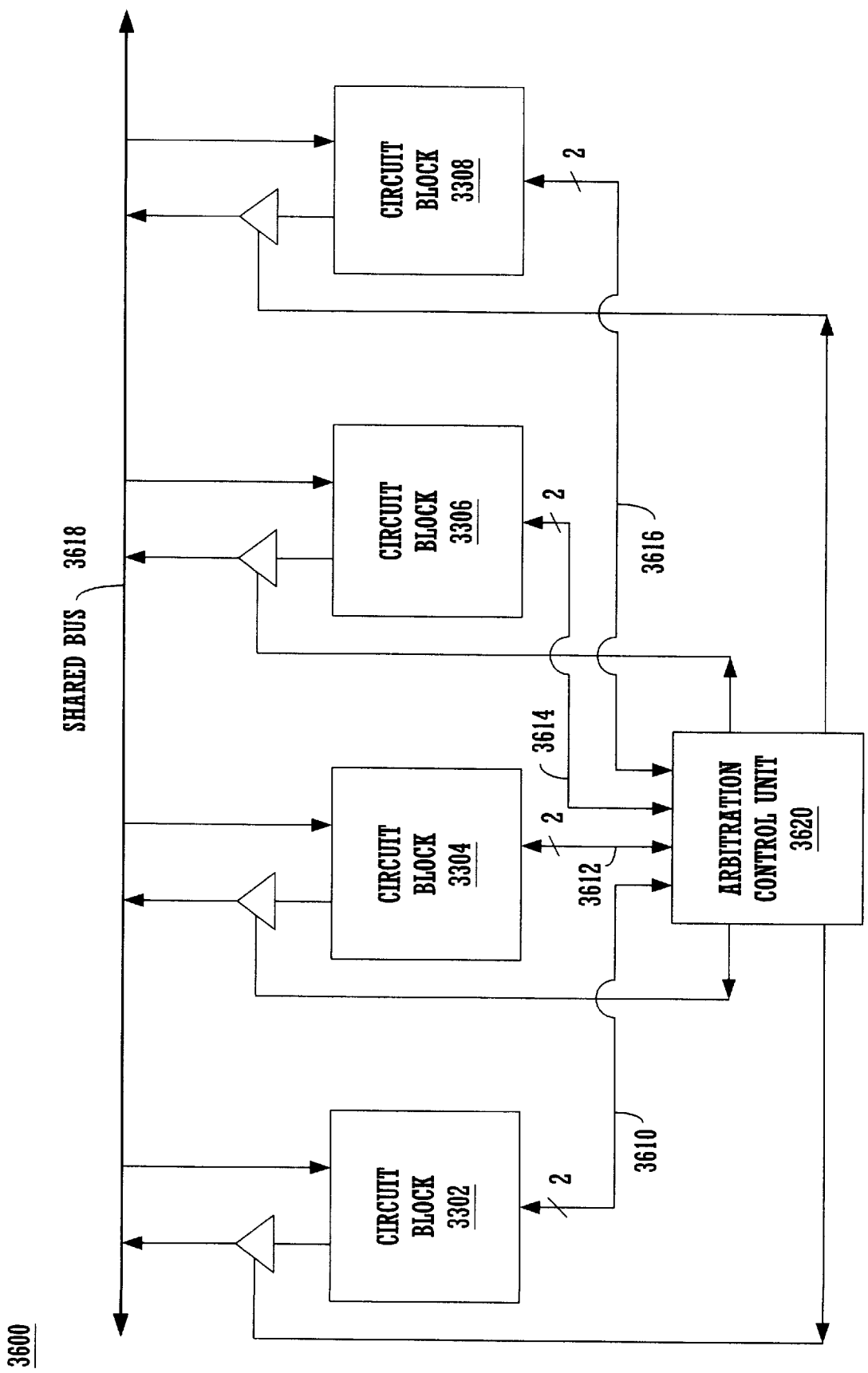
FIG. 36 is a block diagram of another interconnection scheme, where the sharing of the signals over an external off-chip bus is controlled by an external arbitration control unit, in accordance with the present invention.

FIG. 36 is a block diagram of an interconnection scheme 3600, where the sharing of the signals over an external off-chip bus 3618 is controlled by an external arbitration control unit 3620, in accordance with the present invention. Interconnection scheme 3600 illustrates another embodiment in which circuit blocks 3302–3308 can be interconnected without having to change any of their internal circuitry. Interconnection scheme 3600 functions in a similar manner as interconnection scheme 3500 of FIG. 35, except the control signals of interconnection scheme 3600 are not shared, but are point-to-point in accordance with the secondary bus definition, previously discussed. It should be appreciated that lines 3610–3616 are the point-to-point control lines. It should be further appreciated that each one of lines 3610–3616 represent 2 bit buses, respectively. One line is used by arbitration control unit 3620 to indicate to the particular circuit block that it is ready to send data to that circuit block. The other line is used by the circuit block to indicate to arbitration control unit 3620 that it is ready to accept the data.

Figure 37:
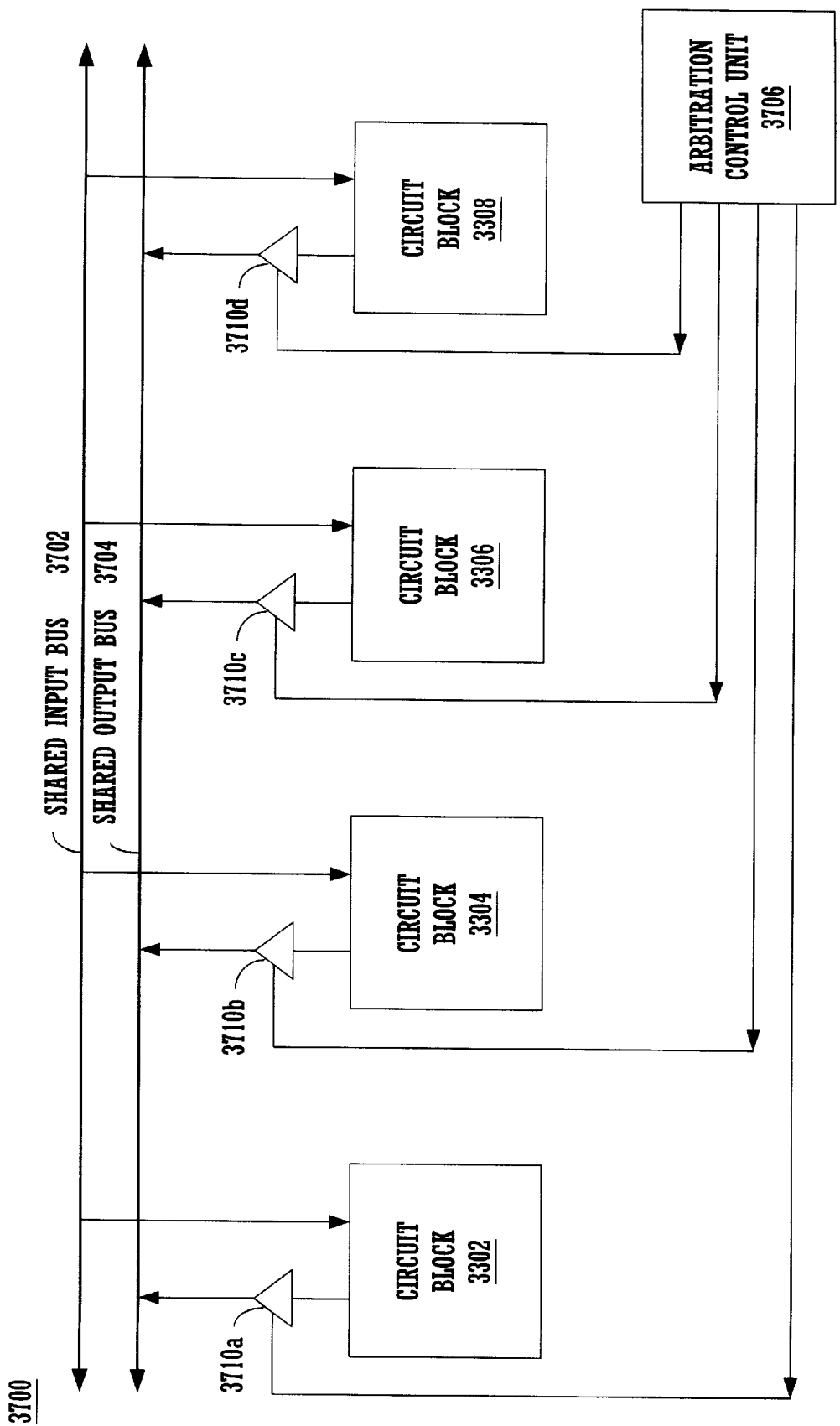
FIG. 37 is a block diagram of an interconnection scheme which includes a shared input bus, a shared output bus, and the sharing of the signals is controlled by an external arbitration control unit, in accordance with the present invention.

FIG. 37 is a block diagram of an interconnection scheme 3700 including a shared input bus 3702, a shared output bus 3704, and the sharing of the signals is controlled by an external arbitration control unit 3706 and external bus control circuits, which are tri-state buffers 3710a–3710d. Interconnection scheme 3700 illustrates another embodiment, in accordance with the present invention, in which circuit blocks 3302–3308 can be interconnected without having to change any of their internal circuitry.

Figure 38:
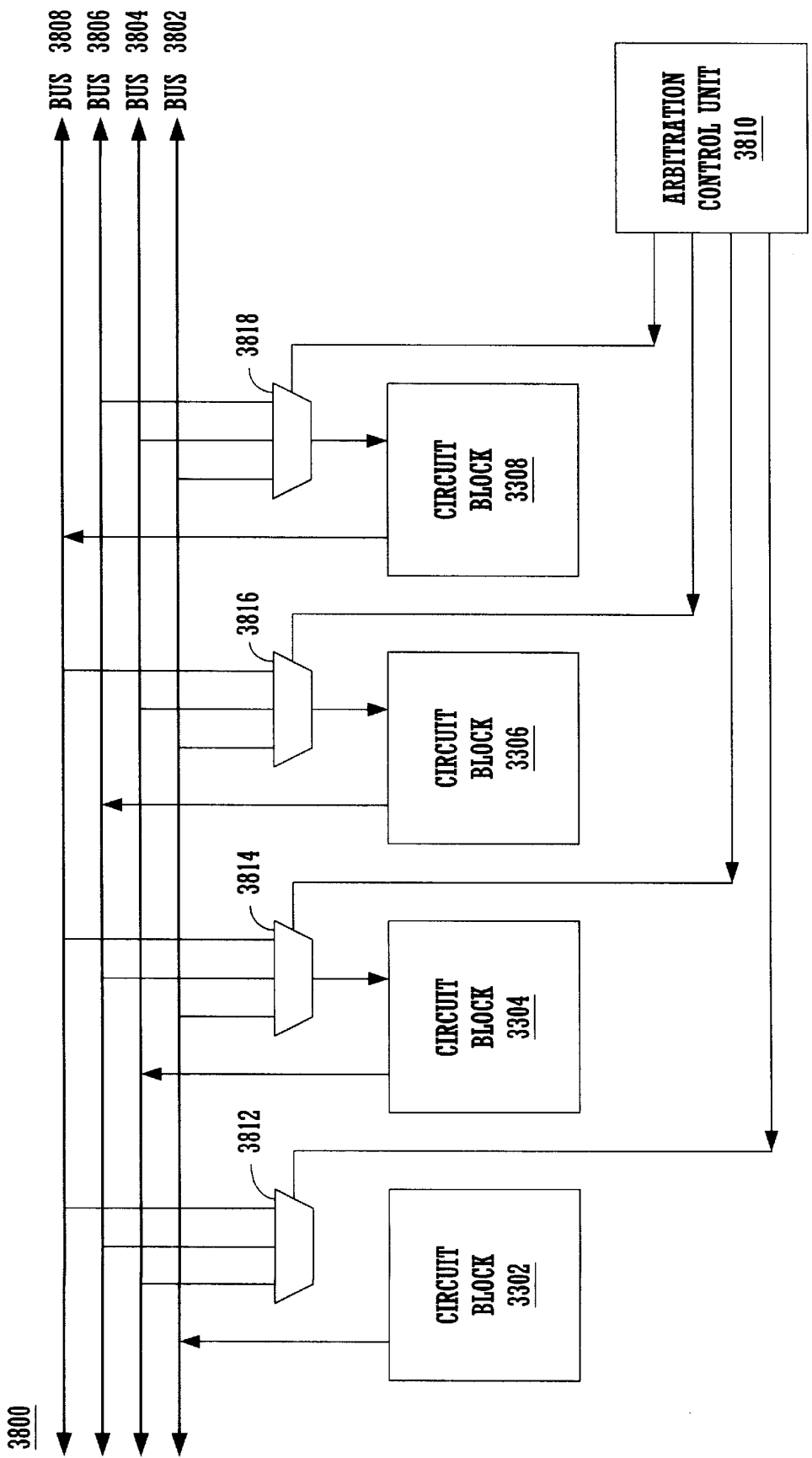
FIG. 38 is a block diagram of an interconnection scheme which includes a dedicated output bus and a shared input bus for each circuit block and the sharing of the signals is controlled by an external arbitration control unit, in accordance with the present invention.

FIG. 38 is a block diagram of an interconnection scheme 3800 which includes a dedicated output bus for each circuit block of circuit blocks 3302–3308 and the sharing of the signals is controlled by an external arbitration control unit 3810, in accordance with the present invention. Interconnection scheme 3800 illustrates another embodiment in which circuit blocks 3302–3308 can be interconnected without having to change any of their internal circuitry. Furthermore, interconnection scheme 3800 is useful for high end applications that have a lot of concurrent traffic between circuit block 3302–3308. There are no tri-state buffers within interconnection scheme 3800, but instead the external bus control circuits are multiplexers (Muxs) 3812–3818. The reason for this type of connection is that each circuit block of circuit blocks 3302–3308 is defined to have a single master port and a single slave port. So the channeling of address or data is not in the control of a receiving circuit block. The advantages of the present invention, as discussed earlier, is that other circuit blocks can later be added to interconnection scheme 3800 which communicates with circuit blocks 3202–3208, but the internal circuitry design of circuit blocks 3202–3208 remain unchanged. Instead, only a Mux and a few lines are needed to connect a new circuit block to interconnection scheme 3800. In other words, the internal circuitry of the existing circuit blocks will not change whether circuit blocks are added to or removed from interconnection scheme 3800.

As discussed previously, secondary bus is defined to promote the reusability of circuit blocks (i.e., modules) within silicon. There are three unique features of the secondary bus definition. First, there is reduced arbitration involved with the secondary bus. Instead, all the arbitration is hidden, while each master assumes that the secondary bus is dedicated for its use. Second, all the control signals from the master and slave blocks are point-to-point signals, which are received by a central module. Third, multiple address phases can be simultaneously outstanding over the secondary bits (FIG. 25). This is accomplished by having the definition of the signals for all slaves such that each slave is to latch an address on the clock signal that it detects a valid cycle. In this manner, the secondary bus can be optimally utilized.

Figure 39A:
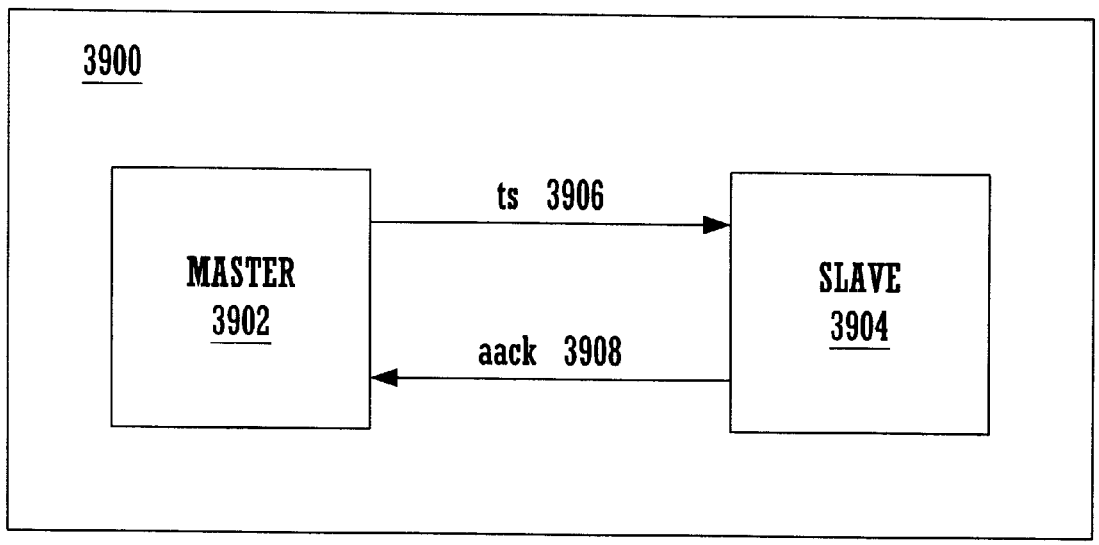
FIG. 39A is a block diagram of an interconnection scheme in accordance with the present invention.
Figure 39B:
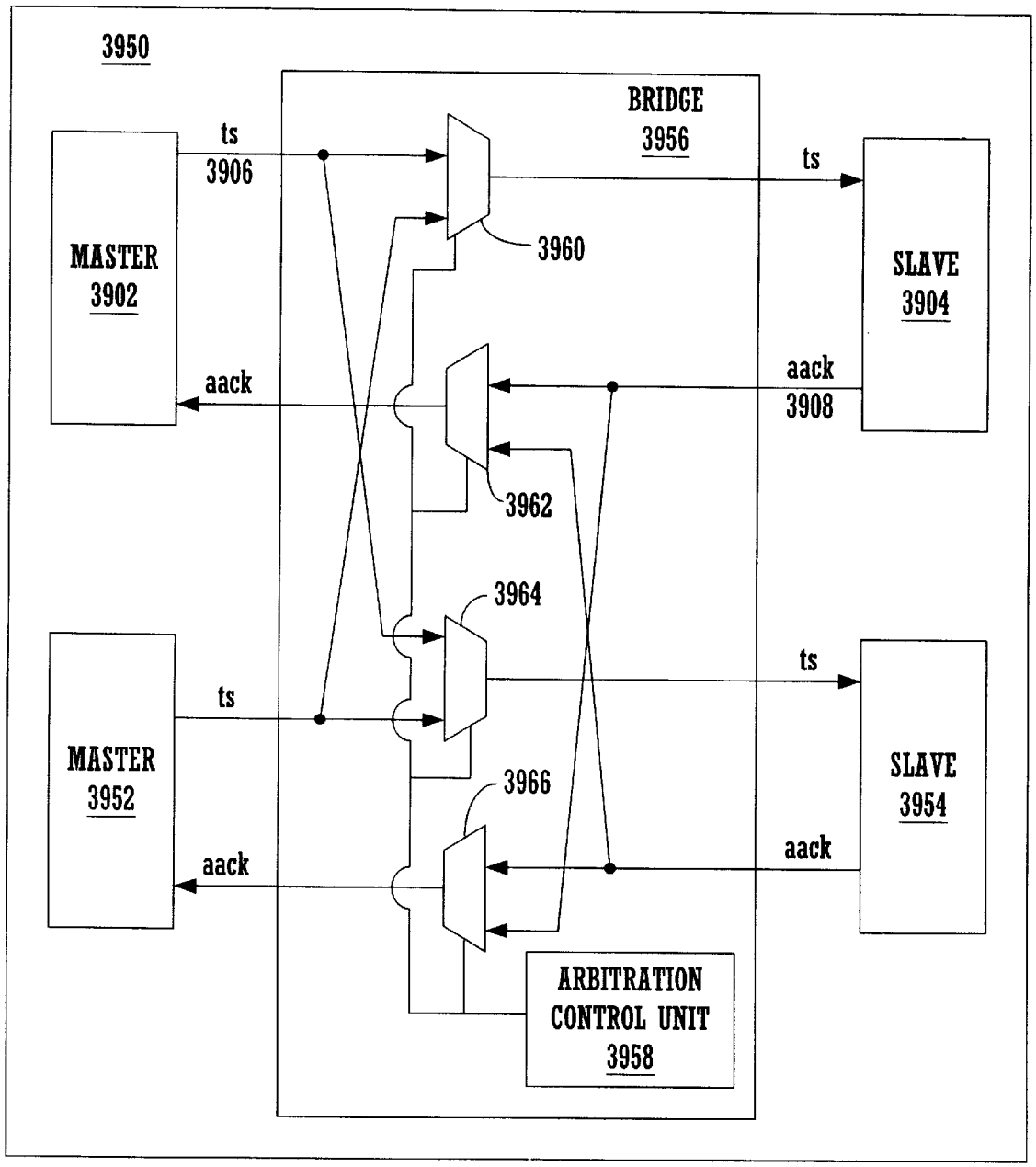
FIG. 39B is a block diagram of another interconnection scheme in accordance with the present invention.

It should be appreciated that the lack of arbitration in combination with point-to-point control signals permits circuit blocks to be connected in different combinations without having to redesign them, which is illustrated by FIGS. 39A and 39B. FIG. 39A is a block diagram of interconnection scheme 3900, in accordance with the present invention. Interconnection scheme 3900 includes a master module 3902 directly connected to a slave module 3904. Specifically, the input of master module 3902 is connected to the output of slave module 3904, while the input of slave module 3904 is connected to the output of master module 3902. The control signals of master module 3902 and slave module 3904 are point-to-point, represent by a transfer start (ts) signal 3906 and an address acknowledge (aack) signal 3908.

FIG. 39B is a block diagram of interconnection scheme 3950, in accordance with the present invention. It should be appreciated that master module 3902 and slave module 3904 are included within both interconnection schemes 3900 and 3950, while no changes were made to their internal circuitry. Instead, only the interconnection scheme around them has changed. The functionality of bridge module 3956 enables master module 3902 and slave module 3904 to operate within interconnection scheme 3950 in exactly the same manner as when they are connected within interconnection scheme 3900 of FIG. 39A, which is one of the advantages associated with the present invention. Within bridge module 3956, an arbitration control unit 3958 utilizes select signals to control Muxs 3960–3966 in order to enable modules 3902, 3904, 3952, and 3954 to operate using point-to-point control signals. Furthermore, arbitration control unit 3958 keeps all arbitration hidden from modules 3902, 3904, 3952, and 3954, while enabling multiple address phases to be simultaneously outstanding.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus for providing communication comprising:
    a secondary bus having a standard communication protocol;
    a plurality of circuit blocks coupled to said secondary bus wherein each circuit block comprises: a bus interface unit; and other functional circuitry, wherein each bus interface unit communicates with a portion of said secondary bus through external bus control circuits and wherein each bus interface unit facilitates communication between said other functional circuitry and said secondary bus, wherein each bus interface unit internally comprises:
        a duplicated master port for establishing a communication of information over said secondary bus using said standard communication protocol; and
        a duplicated slave port for responding to a duplicated master port in receiving or transmitting information over said secondary bus using said standard communication protocol;
    a primary bus for providing point-to-point communication between a memory and a processor; and
    a bridge coupled to provide communication between said primary bus and said secondary bus and wherein said primary bus and said bridge are configurable to support different communication protocols.

2. An apparatus as described in claim 1 further comprising:
    a processor master unit coupled to said primary bus for communicating information from said processor to said primary bus; and
    a processor slave unit coupled to said primary bus for communicating information from said primary bus to said processor.

3. An apparatus as described in claim 2 wherein said bridge comprises:
    an external arbitration control unit coupled to control said external bus control circuits of said plurality of bus interface units with control signals;
    a memory interface coupled to said memory; and
    a processor slave interface coupled to said processor slave unit, said memory interface and said processor slave interface for providing point-to-point communication between said processor and said memory.

4. An apparatus as described in claim 1 wherein said secondary bus is a point-to-point bus.

5. An apparatus as described in claim 3 wherein said secondary bus is a single shared bus and wherein a respective external bus control circuit is coupled between an output of each bus interface unit and said single shared bus, each external bus control circuit comprising a tri-state buffer enabled by a respective control signal from said external arbitration control unit.

6. An apparatus as described in claim 3 wherein said secondary bus comprises:
    a shared input bus; and
    a shared output bus, wherein a respective external bus control circuit is coupled between each bus interface unit and said shared output bus and wherein each external bus control circuit comprises a tri-state buffer enabled by a respective control signal from said external arbitration control unit.

7. An apparatus as described in claim 3 wherein said secondary bus comprises a respective dedicated output bus for each bus interface unit and wherein a respective external bus control circuit is coupled between all dedicated output buses and an input of each bus interface unit, each external bus control circuit comprising a multiplexer enabled by a respective control signal from said external arbitration control unit.

8. An apparatus as described in claim 1 wherein said plurality of circuit blocks comprise:
    a first circuit block comprising a first bus interface unit coupled to a target peripheral component interconnect (PCI) bus, said first bus interface unit coupled to communicate over said secondary communication bus via a first external bus control circuit;
    a second circuit block comprising a second bus interface unit coupled to a target accelerated graphics port (AGP) bus, said second bus interface unit coupled to communicate over said secondary communication bus via a second external bus control circuit; and
    a third circuit block comprising a third bus interface unit coupled to a target serial communication bus, said third bus interface unit coupled to communicate over said secondary communication bug via a third external bus control circuit.

9. An apparatus as described in claim 1 wherein said duplicated master port and said duplicated slave port communicate address information.

10. An apparatus as described in claim 1 wherein said duplicated master port and said duplicated slave port communicate data information.

11. An apparatus for providing communication comprising:
    a secondary bus having an address bus and a data bus communicating under a standard communication protocol;
    a plurality of circuit blocks coupled to said secondary bus wherein each circuit block comprises: a bus interface unit; and other functional circuitry, wherein each bus interface unit communicates with a portion of said secondary bus through external bus control circuits and wherein each bus interface unit facilitates communication between said other functional circuitry and said secondary bus, wherein each bus interface unit internally comprises:
- a duplicated master port for establishing a communication of information over said secondary bus using said standard communication protocol; and
- a duplicated slave port for responding to a duplicated master port in receiving or transmitting information over said secondary bus using said standard communication protocol;
- a primary bus for providing point-to-point communication between a memory and a processor; and
- a bridge coupled to provide communication between said primary bus and said secondary bus and wherein said primary bus and said bridge are configurable to support different communication protocols.

12. An apparatus as described in claim 11 further comprising:
- a processor master unit coupled to said primary bus for communicating information from said processor to said primary bus; and
- a processor slave unit coupled to said primary bus for communicating information from said primary bus to said processor.

13. An apparatus as described in claim 12 wherein said bridge comprises:
- an external address arbitration control unit coupled to control a first portion of said external bus control circuits with first control signals; and
- an external data arbitration control unit coupled to control a second portion of said external bus control circuits with second control signals;
- a memory interface coupled to said memory; and
- a processor slave interface coupled to said processor slave unit, said memory interface and said processor slave interface for providing point-to-point communication between said processor and said memory.

14. An apparatus as described in claim 13 wherein said address bus is a single shared address bus and wherein a respective external bus control circuit is coupled between an address output of each bus interface unit and said single shared address bus, each external control circuit comprising a tri-state buffer enabled by a respective control signal from said external address arbitration control unit.

15. An apparatus as described in claim 13 wherein said data bus is a single shared data bus and wherein a respective external bus control circuit is coupled between a data output of each bus interface unit and said single shared data bus, each external control circuit comprising a tri-state buffer enabled by a respective control signal from said external data arbitration control unit.

16. An apparatus as described in claim 13 wherein said address bus comprises a shared input address bus and a shared output address bus and wherein a respective external bus control circuit is coupled between each bus interface unit and said shared output address bus, each external bus control circuit comprising a tri-state buffer enabled by a respective control signal from said external address arbitration control unit.

17. An apparatus as described in claim 16 wherein said data bus comprises a shared input data bus and a shared output data bus and wherein a respective external bus control circuit is coupled between each bus interface unit and said shared output data bus, each external bus control circuit comprising a tri-state buffer enabled by a respective control signal from said external data arbitration control unit.

18. An apparatus as described in claim 13 wherein said data bus comprises a respective dedicated output data bus for each bus interface unit and wherein a respective external bus control circuit is coupled between all dedicated output data buses and an input of each bus interface unit, each external bus control circuit comprising a multiplexer enabled by a respective control signal from said external data arbitration control unit.

19. An apparatus as described in claim 11 wherein said plurality of circuit blocks comprise:
- a first circuit block comprising a first bus interface unit coupled to a target peripheral component interconnect (PCI) bus, said first bus interface unit coupled to communicate over said address bus and said data bus via a first external bus control circuit;
- a second circuit block comprising a second bus interface unit coupled to a target accelerated graphics port (AGP) bus, said second bus interface unit coupled to communicate over said address bus and said data bus via a second external bus control circuit; and
- a third circuit block comprising a third bus interface unit coupled to a target serial communication bus, said third bus interface unit coupled to communicate over said address bus and said data bus via a third external bus control circuit.

* * * * *